(12) United States Patent
Kang et al.

(10) Patent No.: US 12,634,992 B2
(45) Date of Patent: May 19, 2026

(54) DEVICE AND METHOD FOR PROCESSING SLICE-BASED SYSTEM ACCESS CONFIGURATION INFORMATION IN WIRELESS COMMUNICATION SYSTEM

(71) Applicant: SAMSUNG ELECTRONICS CO., LTD., Suwon-si (KR)

(72) Inventors: Hyunjeong Kang, Suwon-si (KR); Soenghun Kim, Suwon-si (KR); Anil Agiwal, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 410 days.

(21) Appl. No.: 18/040,409

(22) PCT Filed: Jul. 28, 2021

(86) PCT No.: PCT/KR2021/009779
§ 371 (c)(1),
(2) Date: Feb. 2, 2023

(87) PCT Pub. No.: WO2022/030863
PCT Pub. Date: Feb. 10, 2022

(65) Prior Publication Data
US 2023/0292372 A1 Sep. 14, 2023

(30) Foreign Application Priority Data

Aug. 5, 2020 (KR) ........................ 10-2020-0097905
Oct. 21, 2020 (KR) ........................ 10-2020-0136915

(51) Int. Cl.
*H04W 4/00* (2018.01)
*H04W 74/00* (2009.01)
*H04W 74/0833* (2024.01)

(52) U.S. Cl.
CPC ..... *H04W 74/006* (2013.01); *H04W 74/0833* (2013.01)

(58) Field of Classification Search
CPC ........... H04W 74/0833; H04W 74/006; H04W 48/02; H04W 48/12
See application file for complete search history.

(56) References Cited

U.S. PATENT DOCUMENTS 8,199,730 B2 * 6/2012 Ou ........................ H04L 1/1887
370/336
9,468,022 B2 * 10/2016 Li ........................ H04W 52/146
(Continued)

FOREIGN PATENT DOCUMENTS

CN 111448841 A 7/2020
EP 3641433 A1 4/2020
(Continued)

OTHER PUBLICATIONS

Supplementary European Search Report dated Mar. 26, 2024, in connection with European Patent Application No. 21853008.7, 21 pages.

(Continued)

*Primary Examiner* — Stephen M D Agosta

(57) ABSTRACT

The present disclosure relates to a 5G or pre-5G communication system for supporting a data transmission rate higher than that of a 4G communication system, such as LTE. The present disclosure relates to a wireless communication system and, more specifically, disclosed are a method and a device by which processes slice-based system access configuration information of a terminal in a wireless communication system.

10 Claims, 15 Drawing Sheets

(56) References Cited

U.S. PATENT DOCUMENTS

| | | | | |
|---|---|---|---|---|
| 10,206,232 | B2 * | 2/2019 | Novlan | H04W 8/005 |
| 10,491,376 | B1 * | 11/2019 | Suthar | H04L 63/102 |
| 10,595,268 | B2 * | 3/2020 | Lee | H04W 16/02 |
| 10,667,179 | B1 * | 5/2020 | Young | H04W 36/06 |
| 10,834,013 | B2 * | 11/2020 | Guilbeault | H04L 41/0843 |
| 10,863,556 | B2 * | 12/2020 | Lau | H04W 48/10 |
| 10,887,825 | B2 * | 1/2021 | Jager | H04W 28/0284 |
| 10,897,790 | B2 * | 1/2021 | Velev | H04W 8/22 |
| 11,140,544 | B2 * | 10/2021 | Yang | H04W 48/18 |
| 11,206,610 | B2 * | 12/2021 | Lee | H04W 68/005 |
| 11,284,395 | B2 * | 3/2022 | Chai | H04W 72/04 |
| 11,323,335 | B2 * | 5/2022 | Wahlqvist | H04W 24/02 |
| 11,323,945 | B2 * | 5/2022 | Lee | H04L 5/0007 |
| 11,510,137 | B2 * | 11/2022 | Watfa | H04W 36/06 |
| 11,985,676 | B2 * | 5/2024 | Rune | H04L 5/0094 |
| 2010/0103889 | A1 | 4/2010 | Kim et al. | |
| 2012/0033613 | A1 * | 2/2012 | Lin | H04W 74/085 |
| | | | | 370/328 |
| 2014/0177607 | A1 * | 6/2014 | Li | H04W 52/42 |
| | | | | 370/336 |
| 2017/0303259 | A1 * | 10/2017 | Lee | H04W 28/16 |
| 2017/0367120 | A1 * | 12/2017 | Murray | H04W 72/046 |
| 2018/0249513 | A1 * | 8/2018 | Chang | H04W 76/10 |
| 2018/0279186 | A1 * | 9/2018 | Park | H04W 36/302 |
| 2018/0279375 | A1 * | 9/2018 | Jeon | H04W 72/23 |
| 2018/0317264 | A1 | 11/2018 | Agiwal et al. | |
| 2018/0324663 | A1 * | 11/2018 | Park | H04W 36/22 |
| 2019/0174536 | A1 | 6/2019 | Han et al. | |
| 2019/0261244 | A1 * | 8/2019 | Jung | H04L 1/20 |
| 2019/0261411 | A1 * | 8/2019 | Chin | H04W 74/0833 |
| 2019/0313437 | A1 * | 10/2019 | Jung | H04L 5/0042 |
| 2019/0313469 | A1 * | 10/2019 | Karampatsis | H04W 48/04 |
| 2019/0335534 | A1 * | 10/2019 | Atarius | H04L 65/1016 |
| 2019/0342921 | A1 * | 11/2019 | Loehr | H04L 5/0053 |
| 2019/0349901 | A1 * | 11/2019 | Basu Mallick | H04L 5/0048 |
| 2019/0357092 | A1 * | 11/2019 | Jung | H04W 74/0833 |
| 2019/0357122 | A1 | 11/2019 | Li et al. | |
| 2019/0394624 | A1 * | 12/2019 | Karampatsis | H04W 4/40 |
| 2020/0053580 | A1 * | 2/2020 | Bagheri | H04L 5/006 |
| 2020/0053670 | A1 * | 2/2020 | Jung | H04W 56/0015 |
| 2020/0053710 | A1 * | 2/2020 | MolavianJazi | H04W 72/21 |
| 2020/0053797 | A1 * | 2/2020 | Basu Mallick | H04W 74/0808 |
| 2020/0252976 | A1 * | 8/2020 | Murray | H04W 74/0833 |
| 2020/0280894 | A1 * | 9/2020 | Koskinen | H04L 5/0053 |
| 2020/0337050 | A1 * | 10/2020 | Mildh | H04W 72/0453 |
| 2020/0351718 | A1 * | 11/2020 | Dong | H04W 28/0252 |
| 2020/0351756 | A1 * | 11/2020 | Jager | H04W 48/10 |
| 2020/0359291 | A1 * | 11/2020 | Ramle | H04W 48/18 |
| 2021/0021536 | A1 * | 1/2021 | Ganesan | H04L 47/56 |
| 2021/0068036 | A1 * | 3/2021 | Chun | H04W 48/02 |
| 2021/0227450 | A1 * | 7/2021 | Chun | H04W 48/06 |
| 2021/0250853 | A1 * | 8/2021 | Corston-Petri | H04W 48/18 |
| 2021/0377814 | A1 * | 12/2021 | Sillanpaa | H04W 72/04 |
| 2022/0022266 | A1 * | 1/2022 | Agiwal | H04W 74/004 |
| 2022/0239568 | A1 * | 7/2022 | Celozzi | H04L 41/342 |
| 2022/0256439 | A1 * | 8/2022 | Casati | H04W 48/18 |

FOREIGN PATENT DOCUMENTS

| | | |
|---|---|---|
| EP | 4120760 A1 | 1/2023 |
| EP | 4135465 A1 | 2/2023 |
| KR | 101033689 B1 | 5/2011 |
| KR | 20190018170 A | 2/2019 |
| KR | 20190135060 A | 12/2019 |
| WO | 2021093173 A1 | 5/2021 |

OTHER PUBLICATIONS

International Search Report and Written Opinion of the International Searching Authority dated Oct. 22, 2021, in connection with International Application No. PCT/KR2021/009779, 10 pages.

3GPP TS 38.331 V16.9.0 (Jun. 2022) Technical Specification; 3rd Generation Partnership Project; Technical Specification Group Radio Access Network; NR; Radio Resource Control (RRC) protocol specification (Release 16); 966 pages.

Nokia et al., "RACH isolation for Slices," 3GPP TSG-RAN WG2 Meeting #95bis, R2-166172, Kaohsiung, Taiwan, Oct. 10-14, 2016, 3 pages.

Office Action issued Dec. 17, 2025, in connection with Korean Patent Application No. 10-2020-0136915, 9 pages.

* cited by examiner

Backhaul communication unit

240

Controller

230

Storage

210

RF unit

Figure 4:
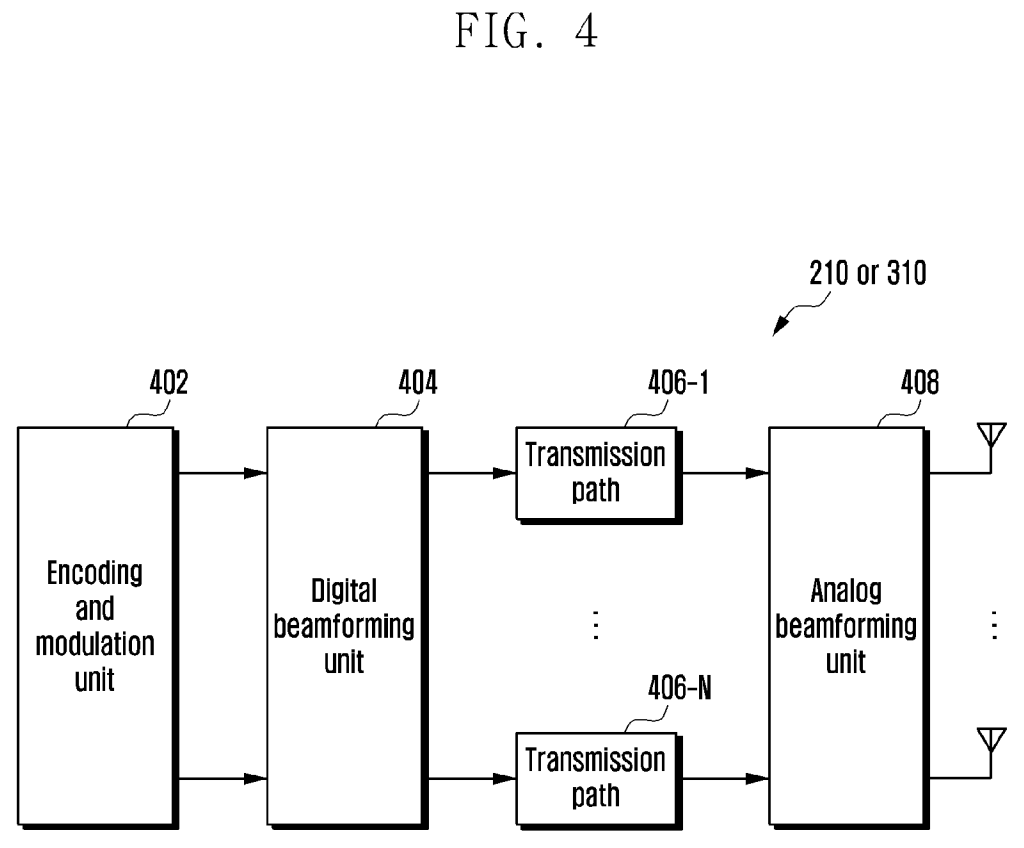

402 Encoding and modulation unit

404 Digital beamforming unit 406-1 Transmission path

406-N Transmission path

408 Analog beamforming unit

Initial UL BWP of NUL

Initial UL BWP of SUL

RACH-ConfigCommon

RACH-ConfigCommonSlice for slice 1

RACH-ConfigCommonSlice for slice 2

FIG. 14

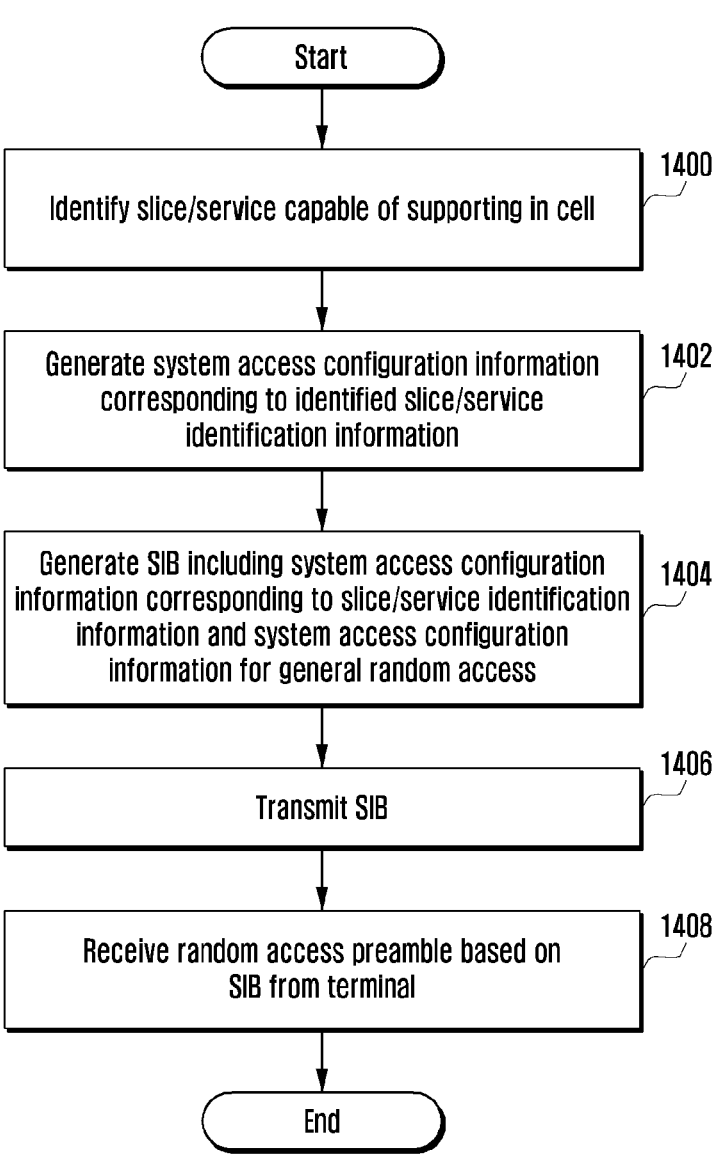

Start

Identify slice/service capable of supporting in cell — 1400

Generate system access configuration information corresponding to identified slice/service identification information — 1402

Generate SIB including system access configuration information corresponding to slice/service identification information and system access configuration information for general random access — 1404

Transmit SIB — 1406

Receive random access preamble based on SIB from terminal — 1408

End

DEVICE AND METHOD FOR PROCESSING SLICE-BASED SYSTEM ACCESS CONFIGURATION INFORMATION IN WIRELESS COMMUNICATION SYSTEM

CROSS-REFERENCE TO RELATED APPLICATIONS

This application is a 371 of International Application No. PCT/KR2021/009779 filed Jul. 28, 2021, which claims priority to Korean Patent Application No. 10-2020-0097905 filed on Aug. 5, 2020, and Korean Patent Application No. 10-2020-0136915 filed on Oct. 21, 2020, the disclosures of which are herein incorporated by reference in their entirety.

BACKGROUND

1. Field

The disclosure relates to a wireless communication system, and more particularly, to a method and device for processing slice-based system access configuration information of a terminal in a wireless communication system.

2. Description of Related Art

In order to satisfy increases in demand for wireless data traffic now that a 4th generation (4G) communication system is commercially available, efforts are being made to develop an enhanced 5th generation (5G) communication system or a pre-5G communication system. Therefore, a 5G communication system or a pre-5G communication system is referred to as a beyond 4G network communication system or a post long term evolution (LTE) system.

In order to achieve a high data transmission rate, consideration is being given to implementing the 5G communication system in a mmWave band (e.g., 60 GHz band). In order to mitigate any route loss of electronic waves in a mmWave band and to increase transmission distances of electronic waves, the technologies of beamforming, massive multiple input and multiple output (MIMO), full dimensional MIMO (FD-MIMO), array antenna, analog beamforming, and large scale antenna are being discussed for the 5G communication system.

Further, in order to enhance networks in the 5G communication system, the technologies of an innovative small cell, advanced small cell, cloud radio access network (cloud RAN), ultra-dense network, device to device communication (D2D), wireless backhaul, moving network, cooperative communication, coordinated multi-points (CoMP), and interference cancellation are being developed.

Further, hybrid frequency shift keying and quadrature amplitude modulation (FQAM) and sliding window superposition coding (SWSC), which are advanced coding modulation (ACM) methods; and filter bank multi carrier (FBMC), non-orthogonal multiple access (NOMA), and sparse code multiple access (SCMA), which are advanced access technologies, are being developed for the 5G system.

Innovation of Internet from a human-centered connection network in which a human generates and consumes information to an Internet of Things (IoT) network that gives and receives and processes information to and from distributed components such as things has occurred. Internet of everything (IoE) technology in which big data processing technology through connection to a cloud server is combined with IoT technology has been appeared. In order to implement the IoT, technology elements such as sensing technology, wired and wireless communication and network infrastructure, service interface technology, and security technology are required; thus, nowadays, research is being carried out on technology of a sensor network, machine to machine (M2M), and machine type communication (MTC) for connection between things. In an IoT environment, an intelligent Internet technology (IT) service that collects and analyzes data generated in connected things to provide a new value to human lives may be provided. The IoT may be applied to the field of a smart home, smart building, smart city, smart car or connected car, smart grid, health care, smart home appliances, and high-tech medical service through fusion and complex connections between existing information technology (IT) and various industries.

Accordingly, various attempts for applying a 5G communication system to an IoT network are being made. For example, 5G communication technologies such as a sensor network, machine to machine (M2M), and machine type communication (MTC) have been implemented by the technique of beamforming, MIMO, and array antenna. Application of a cloud RAN as the foregoing big data processing technology may be an example of convergence of 5G technology and IoT technology.

In 5G, network slicing technology was introduced. Each network slice refers to a separate end-to-end network tailored to meet various requirements requested by a specific application.

SUMMARY

The disclosure provides a device and method in which a terminal acquires network slice-based system access configuration information and performs a system access procedure in a wireless communication system.

Further, the disclosure provides a device and method in which a terminal acquires network slice-based system access control configuration information and performs a system access procedure in a wireless communication system.

According to an embodiment of the disclosure, a method for a terminal to process network slice-based system access configuration information in a wireless communication system may include receiving system access configuration information corresponding to a network slice of the terminal from a base station; performing, if system access configuration information corresponding to a network slice is acquired, a system access procedure using the system access configuration information; and performing, if system access configuration information corresponding to the network slice is not acquired, a system access procedure using general system access configuration information.

According to an embodiment of the disclosure, a method for a terminal to process network slice-based system access control configuration information in a wireless communication system may include receiving system access control configuration information corresponding to a network slice of the terminal from a base station; performing, if system access control configuration information corresponding to a network slice is acquired, a system access procedure using the system access control configuration information; and performing, if the system access control configuration information corresponding to the network slice is not acquired, a system access procedure using general system access control configuration information.

According to an embodiment of the disclosure, a method performed by a base station in a wireless communication system may include transmitting, to a terminal, system information including random access configuration information corresponding to each of at least one slice; and receiving, from the terminal, a random access preamble based on the system information, wherein the random access configuration information corresponding to each of the at least one slice may include information on a random access resource corresponding to each of the at least one slice, and wherein the information on the random access resource may be provided by being mapped to identification information of each of the at least one slice.

According to an embodiment of the disclosure, a method performed by a terminal in a wireless communication system may include receiving, from a base station, system information including random access configuration information corresponding to each of at least one slice; and transmitting, to the base station, a random access preamble based on the system information, wherein the random access configuration information corresponding to each of the at least one slice may include information on a random access resource corresponding to each of the at least one slice, and wherein the information on the random access resource may be mapped to identification information of each of the at least one slice.

Further, a base station in a wireless communication system may include a transceiver; and a controller configured to control the transceiver to transmit system information including random access configuration information corresponding to each of at least one slice to a terminal and to control the transceiver to receive a random access preamble from the terminal based on the system information, wherein the random access configuration information corresponding to each of the at least one slice may include information on a random access resource corresponding to each of the at least one slice, and wherein the information on the random access resource may be mapped to identification information of each of the at least one slice.

Further, a terminal in a wireless communication system may include a transceiver; and a controller configured to control the transceiver to receive system information including random access configuration information corresponding to each of at least one slice from a base station and to control the transceiver to transmit a random access preamble to the base station based on the system information, wherein the random access configuration information corresponding to each of the at least one slice may include information on a random access resource corresponding to each of the at least one slice, and wherein the information on the random access resource may be mapped to identification information of each of the at least one slice.

According to the disclosure, a terminal can efficiently access a system based on a network slice.

BRIEF DESCRIPTION OF THE DRAWINGS

FIG. 2 illustrates a constitution of a base station in a wireless communication system according to an embodiment of the disclosure.

FIG. 4 illustrates a constitution of a communication unit in a wireless communication system according to an embodiment of the disclosure.

FIG. 14 is a flowchart illustrating an operation of transmitting random access configuration information of a base station according to an embodiment of the disclosure.

DETAILED DESCRIPTION

Figure 1:
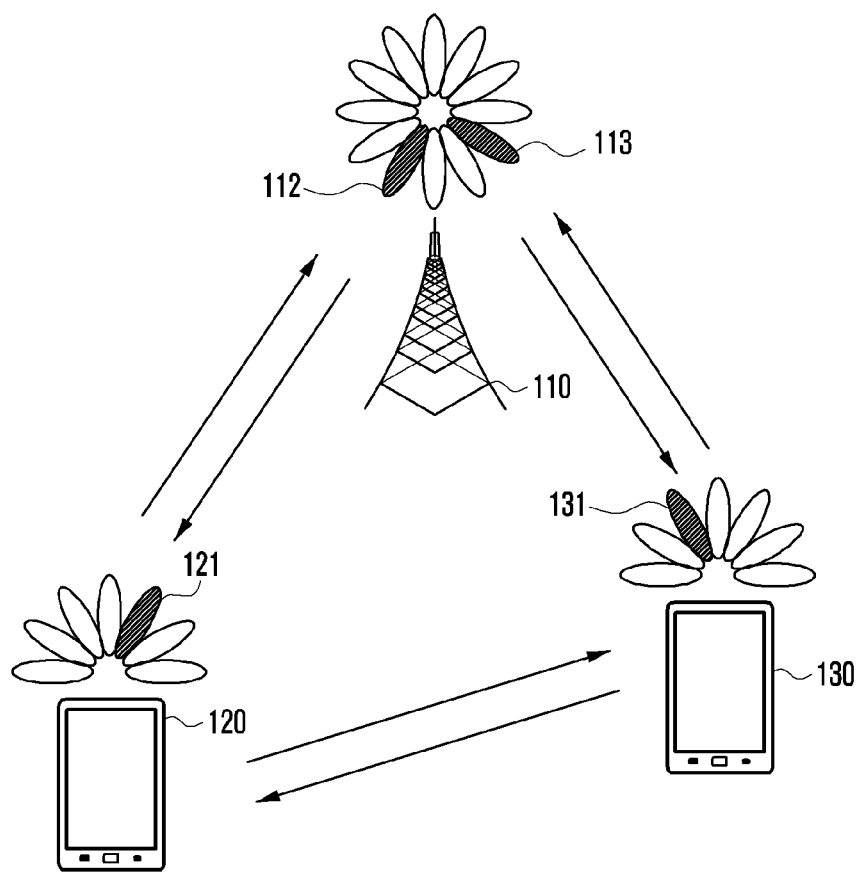
FIG. 1 illustrates a wireless communication system according to an embodiment of the disclosure.

Hereinafter, preferred embodiments of the disclosure will be described in detail with reference to the accompanying drawings. In this case, it should be noted that in the accompanying drawings, the same components are denoted by the same reference numerals if possible. Further, detailed descriptions of well-known functions and constitutions that may obscure the gist of the disclosure will be omitted.

In describing embodiments in this specification, descriptions of technical contents that are well known in the technical field to which the disclosure pertains and that are not directly related to the disclosure will be omitted. This is to more clearly convey the gist of the disclosure without obscuring the gist of the disclosure by omitting unnecessary description.

For the same reason, some components are exaggerated, omitted, or schematically illustrated in the accompanying drawings. Further, the size of each component does not fully reflect the actual size. In each drawing, the same reference numerals are given to the same or corresponding components.

Advantages and features of the disclosure, and a method of achieving them will become apparent with reference to the embodiments described below in detail in conjunction with the accompanying drawings. However, the disclosure is not limited to the embodiments disclosed below, but may be implemented in various different forms, and only these embodiments enable the disclosure to be complete, and are provided to fully inform the scope of the disclosure to those of ordinary skill in the art to which the disclosure pertains, and the disclosure is only defined by the scope of the claims. Like reference numerals refer to like components throughout the specification.

In this case, it will be understood that each block of flowcharts and combinations of the flowcharts may be performed by computer program instructions. Because these computer program instructions may be mounted in a processor of a general purpose computer, special purpose computer, or other programmable data processing equipment, the instructions performed by a processor of a computer or other programmable data processing equipment generate a means that performs functions described in the flowchart block(s). Because these computer program instructions may be stored in a computer usable or computer readable memory that may direct a computer or other programmable data processing equipment in order to implement a function in a particular manner, the instructions stored in the computer usable or computer readable memory may produce a production article containing instruction means for performing the function described in the flowchart block(s). Because the computer program instructions may be mounted on a computer or other programmable data processing equipment, a series of operational steps are performed on the computer or other programmable data processing equipment to generate a computer-executed process; thus, instructions for performing a computer or other programmable data processing equipment may provide steps for performing functions described in the flowchart block(s).

Further, each block may represent a module, a segment, or a portion of a code including one or more executable instructions for executing specified logical function(s). Further, it should be noted that in some alternative implementations, functions recited in the blocks may occur out of order. For example, two blocks illustrated one after another may in fact be performed substantially simultaneously, or the blocks may be sometimes performed in the reverse order according to the corresponding function.

In this case, the term '-unit' used in this embodiment means software or hardware components such as FPGA or ASIC, and '-unit' performs certain roles. However, '-unit' is not limited to software or hardware. '-unit' may be formed to reside in an addressable storage medium or may be formed to reproduce one or more processors. Therefore, as an example, '-unit' includes components such as software components, object-oriented software components, class components, and task components, processes, functions, properties, procedures, subroutines, segments of program code, drivers, firmware, microcode, circuit, data, databases, data structures, tables, arrays, and variables. Functions provided in the components and '-units' may be combined into a smaller number of components and '-units' or may be further separated into additional components and '-units'. Further, components and '-units' may be implemented to reproduce one or more CPUs in a device or secure multimedia card.

In describing the embodiments of the disclosure in detail, a new RAN (NR) on the 5G mobile communication standard specified by 3GPP, which is a mobile communication standardization organization, a radio access network (NR), and a packet core (5G system, 5G core network, or next generation core (NG Core)), which is a core network are a main target, but the main gist of the disclosure is applicable even to other communication systems having a similar technical background with slight modifications within the scope not significantly departing from the scope of the disclosure, which will be possible at determination of a person skilled in the technical field of the disclosure.

In a 5G system, in order to support network automation, a network data collection and analysis function (NWDAF), which is a network function that provides a function of analyzing and providing data collected in a 5G network, may be defined. The NWDAF may collect/store/analyze information from the 5G network and provide results to unspecified network functions (NFs), and the analysis results may be used independently in each NF.

Hereinafter, for convenience of description, some terms and names defined in the 3rd generation partnership project long term evolution (3GPP) standard (standards of 5G, NR, LTE, or similar systems) may be used. However, the disclosure is not limited by the terms and names, and may be equally applied to systems conforming to other standards.

Hereinafter, the disclosure relates to a device and method for processing slice-based system access configuration and access control configuration information in a wireless communication system. Specifically, in the disclosure, the terminal acquires a system access configuration and system access control configuration information for each network slice and performs a system access procedure through a base station using a system access configuration and system access control configuration information of a network slice corresponding to the terminal.

A term indicating a signal, a term indicating a channel, a term indicating control information, a term indicating network entities, and a term indicating components of a device used in the following description are exemplified for convenience of description. Accordingly, the disclosure is not limited to used terms, and other terms having equivalent technical meanings may be used.

In the following description, a physical channel and a signal may be used interchangeably with data or a control signal. For example, although a physical downlink shared channel (PDSCH) is a term indicating a physical channel that transmits data, the PDSCH may be used for indicating data. That is, in the disclosure, an expression 'transmits a physical channel' may be interpreted equivalently to an expression 'transmits data or a signal through a physical channel'.

Hereinafter, in the disclosure, higher signaling refers to a method of transmitting a signal from a base station to a terminal using a downlink data channel of a physical layer or from a terminal to a base station using an uplink data channel of a physical layer. Higher signaling may be understood as radio resource control (RRC) signaling or a media access control (MAC) control element (CE).

Further, in the disclosure, in order to determine whether a specific condition is satisfied or fulfilled, an expression of more than or less than has been used, but this is only a description for expressing an example, and does not exclude a description of a specific number or more or a specific number or lower. Conditions described as a 'specific number or more' may be replaced with 'more than a specific number', conditions described as a 'specific number or lower' may be replaced with 'less than a specific number', and conditions described as a 'specific number or more and less than a specific number' may be replaced with 'more than a specific number and a specific number or lower'.

Further, although the disclosure describes embodiments using terms used in some communication standards (e.g., 3rd generation partnership project (3GPP)), this is only an example for description. Embodiments of the disclosure may be easily modified and applied even in other communication systems.

FIG. 1 illustrates a wireless communication system according to an embodiment of the disclosure.

FIG. 1 illustrates a base station 110, a terminal 120, and a terminal 130 as some of nodes using a wireless channel in a wireless communication system. FIG. 1 illustrates only one base station, but other base stations identical or similar to the base station 110 may be further included.

The base station 110 is a network infrastructure that provides wireless access to the terminals 120 and 130. The base station 110 has coverage defined as a certain geographic area based on a distance capable of transmitting a signal. In addition to the base station, the base station 110 may be referred to as an 'access point (AP)', 'eNodeB (eNB)', '5th generation node (5G node)', 'next generation nodeB' (gNB)', 'wireless point', 'transmission/reception point (TRP)', or other terms having an equivalent technical meaning.

Each of the terminal 120 and the terminal 130 is a device used by a user, and performs communication with the base station 110 through a wireless channel. A link from the base station 110 to the terminal 120 or the terminal 130 is referred to as a downlink (DL), and a link from the terminal 120 or the terminal 130 to the base station 110 is referred to as an uplink (UL). In some cases, at least one of the terminal 120 or the terminal 130 may be operated without the user's involvement. That is, at least one of the terminal 120 or the terminal 130 is a device that performs machine type communication (MTC) and may not be carried by the user. Each of the terminal 120 and the terminal 130 may be referred to as a 'user equipment (UE)', 'mobile station', 'subscriber station', 'remote terminal, 'wireless terminal', 'user device', or other terms having an equivalent technical meaning other than a terminal.

The base station 110, the terminal 120, and the terminal 130 may transmit and receive radio signals in millimeter wave (mmWave) bands (e.g., 28 GHz, 30 GHz, 38 GHz, and 60 GHz). In this case, in order to improve a channel gain, the base station 110, the terminal 120, and the terminal 130 may perform beamforming. Here, the beamforming may include transmission beamforming and reception beamforming. That is, the base station 110, the terminal 120, and the terminal 130 may impart directivity to a transmission signal or a reception signal. To this end, the base station 110 and the terminals 120 and 130 may select serving beams 112, 113, 121, and 131 through abeam search or beam management procedure. After the serving beams 112, 113, 121, and 131 are selected, subsequent communication may be performed through a resource in a quasi co-located (QCL) relationship with a resource that has transmitted the serving beams 112, 113, 121, and 131.

When large-scale characteristics of a channel that has transmitted a symbol on a first antenna port may be inferred from a channel that has transmitted a symbol on a second antenna port, it may be evaluated that the first antenna port and the second antenna port are in a QCL relationship. For example, large-scale characteristics may include at least one of delay spread, Doppler spread, Doppler shift, average gain, average delay, or spatial receiver parameter.

The base station and the terminal are connected through a Uu interface. The UL refers to a radio link through which a terminal transmits data or control signals to a base station, and the DL refers to a radio link through which a base station transmits data or control signals to a terminal.

Figure 2:
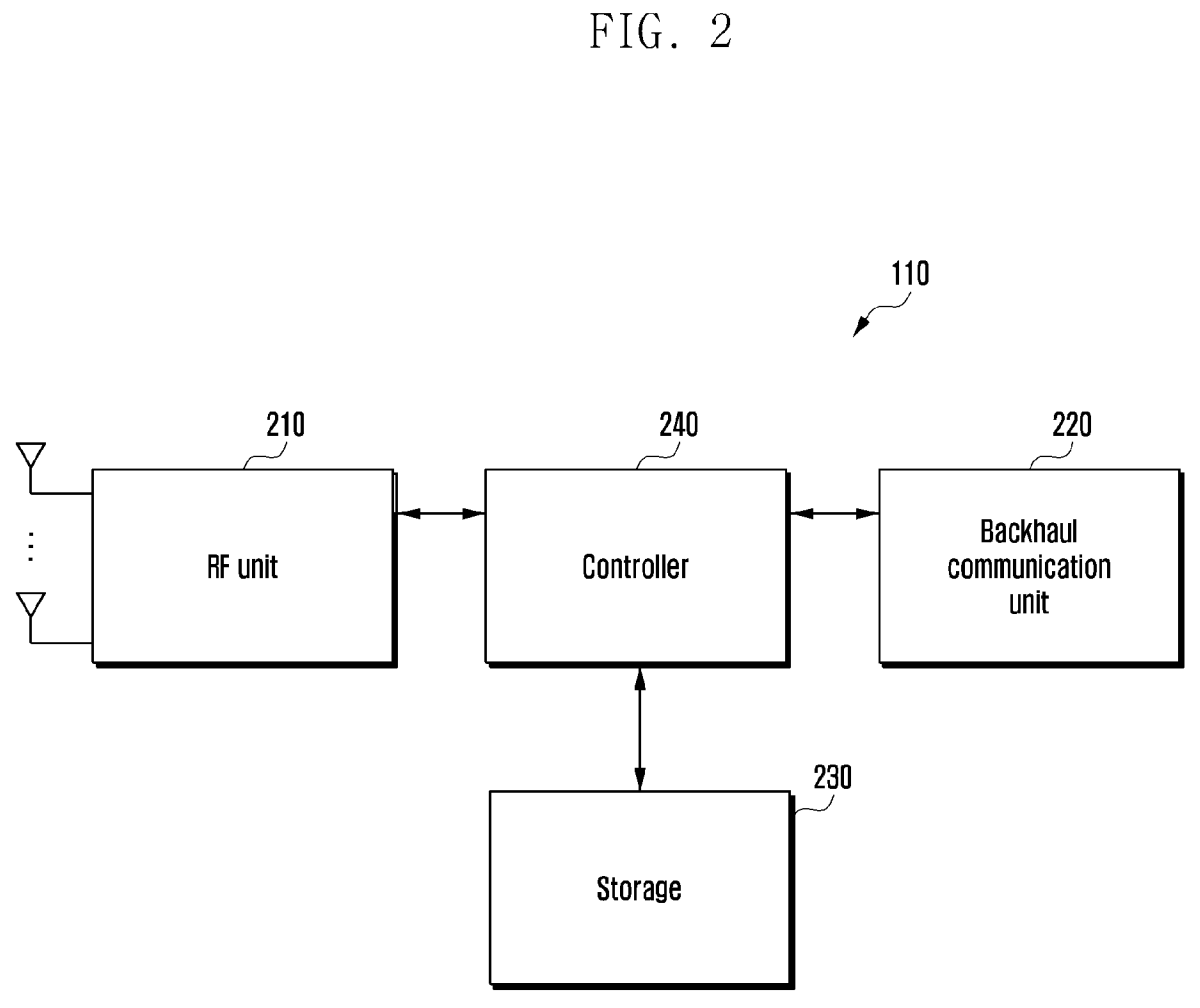

FIG. 2 illustrates a constitution of a base station in a wireless communication system according to an embodiment of the disclosure. The configuration illustrated in FIG. 2 may be understood as a constitution of the base station 110. Terms such as ' . . . unit' and ' . . . group' used hereinafter mean a unit that processes at least one function or operation, which may be implemented in hardware or software, or a combination of hardware and software.

With reference to FIG. 2, the base station 110 includes a RF unit 210, a backhaul communication unit 220, a storage 230, and a controller 240. However, the components of the base station are not limited to the above-described example. For example, the base station may include more or fewer components than the above-described components. Further, the RF unit 210, the backhaul communication unit 220, the storage 230, and the controller 240 may be implemented in the form of a single chip. Further, the controller 240 may include one or more processors.

The RF unit 210 performs functions for transmitting and receiving signals through a wireless channel. For example, the RF unit 210 may perform a function of converting between a baseband signal and a bit string according to a physical layer standard of the system. For example, when transmitting data, the RF unit 210 may encode and modulate a transmitted bit string to generate complex symbols. Further, when receiving data, the RF unit 210 restores a received bit string by demodulating and decoding the baseband signal.

Further, the RF unit 210 up-converts the baseband signal into a radio frequency (RF) band signal, transmits the RF band signal through the antenna, and down-converts the RF band signal received through the antenna into a baseband signal. To this end, the RF unit 210 may include a transmission filter, a reception filter, an amplifier, a mixer, an oscillator, a digital to analog converter (DAC), an analog to digital converter (ADC), and the like. Further, the RF unit 210 may include a plurality of transmission and reception paths. Furthermore, the RF unit 210 may include at least one antenna array composed of a plurality of antenna elements.

In terms of hardware, the RF unit 210 may be composed of a digital unit and an analog unit, and the analog unit may be composed of a plurality of sub-units according to operating power, operating frequency, and the like. The digital unit may be implemented into at least one processor (e.g., digital signal processor (DSP)).

The RF unit 210 transmits and receives signals, as described above. Accordingly, all or part of the RF unit 210 may be referred to as a 'transmitter', 'receiver', or 'transceiver'. Further, in the following description, transmission and reception performed through a wireless channel is used as the meaning including processing as described above by the RF unit 210.

The backhaul communication unit 220 provides an interface for performing communication with other nodes in the network. That is, the backhaul communication unit 220 converts a bit string transmitted from the base station 110 to another node, for example, another access node, another base station, an upper node, and a core network into a physical signal, and converts a physical signal received from another node into a bit string.

The storage 230 stores data such as a basic program, an application program, and configuration information for an operation of the base station 110. The storage 230 may be composed of a volatile memory, a non-volatile memory, or a combination of a volatile memory and a non-volatile memory. The storage 230 provides stored data according to the request of the controller 240.

The controller 240 controls overall operations of the base station 110. For example, the controller 240 may transmit and receive a signal through the RF unit 210 or through the backhaul communication unit 220. Further, the controller 240 writes and reads data in the storage 230. The controller 240 may perform functions of a protocol stack required by the communication standard. According to another implementation example, the protocol stack may be included in the RF unit 210. To this end, the controller 240 may include at least one processor. According to embodiments, the controller 240 may control the base station 110 to perform operations according to embodiments to be described later.

Figure 3:
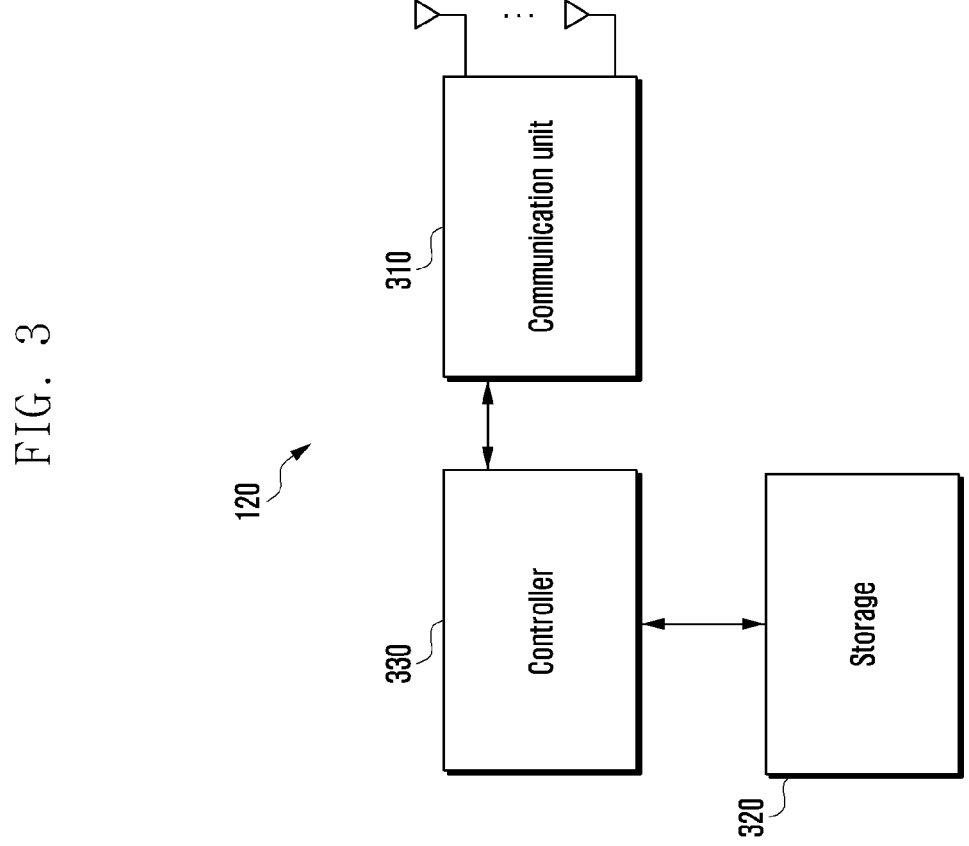
FIG. 3 illustrates a constitution of a terminal in a wireless communication system according to an embodiment of the disclosure.

FIG. 3 illustrates a constitution of a terminal in a wireless communication system according to an embodiment of the disclosure.

The constitution illustrated in FIG. 3 may be understood as a constitution of the terminal 120. Terms such as ' . . . unit' and ' . . . group' used hereinafter mean a unit that processes at least one function or operation, which may be implemented in hardware or software, or a combination of hardware and software.

With reference to FIG. 3, the terminal 120 includes a communication unit 310, a storage 320, and a controller 330. However, the components of the terminal 120 are not limited to the above-described example. For example, the terminal 120 may include more or fewer components than the aforementioned components. Further, the communication unit 310, the storage 320, and the controller 330 may be implemented in the form of a single chip. Further, the controller 330 may include one or more processors.

The communication unit 310 performs functions of transmitting and receiving signals through a wireless channel. For example, the communication unit 310 may perform a function of converting between a baseband signal and a bit string according to a physical layer standard of the system. For example, when transmitting data, the communication unit 310 may encode and modulate a transmitted bit string to generate complex symbols. Further, when receiving data, the communication unit 310 restores a received bit string by demodulating and decoding a baseband signal. Further, the communication unit 310 up-converts a baseband signal into an RF band signal, transmits the RF band signal through the antenna, and down-converts the RF band signal received through the antenna into a baseband signal. For example, the communication unit 310 may include a transmission filter, a reception filter, an amplifier, a mixer, an oscillator, a DAC, an ADC, and the like.

Further, the communication unit 310 may include a plurality of transmission and reception paths. Furthermore, the communication unit 310 may include at least one antenna array composed of a plurality of antenna elements. In terms of hardware, the communication unit 310 may include a digital circuit and an analog circuit (e.g., radio frequency integrated circuit (RFIC)). Here, the digital circuit and the analog circuit may be implemented into one package. Further, the communication unit 310 may include a plurality of RF chains. Furthermore, the communication unit 310 may perform beamforming.

The communication unit 310 transmits and receives signals, as described above. Accordingly, all or part of the communication unit 310 may be referred to as a 'transmitter', 'receiver', or 'transceiver'. Further, in the following description, transmission and reception performed through a wireless channel are used as the meaning including processing as described above by the communication unit 310.

The storage 320 stores data such as a basic program, an application program, and configuration information for an operation of the terminal 120. The storage 320 may be composed of a volatile memory, a non-volatile memory, or a combination of a volatile memory and a non-volatile memory. The storage 320 provides stored data according to the request of the controller 330.

The controller 330 controls overall operations of the terminal 120. For example, the controller 330 may transmit and receive signals through the communication unit 310. Further, the controller 330 writes and reads data in the storage 320. The controller 330 may perform functions of a protocol stack required by the communication standard. To this end, the controller 330 may include at least one processor or microprocessor, or may be a part of the processor. Further, a part of the communication unit 310 and the controller 330 may be referred to as a communication processor (CP). According to embodiments, the controller 330 may control the terminal 120 to perform operations according to embodiments to be described later.

FIG. 4 illustrates a constitution of a communication unit in a wireless communication system according to an embodiment of the disclosure.

FIG. 4 illustrates an example of a detailed constitution of the RF unit 210 of FIG. 2 or the communication unit 310 of FIG. 3. Specifically, FIG. 4 illustrates components for performing beamforming as a part of the RF unit 210 of FIG. 2 or the communication unit 310 of FIG. 3.

With reference to FIG. 4, the RF unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity identify (LDPC) code, a convolution code, or a polar code may be used. The encoding and modulation unit 402 performs constellation mapping to generate modulation symbols.

The digital beamforming unit 404 performs beamforming on a digital signal (e.g., modulation symbols). To this end, the digital beamforming unit 404 multiplies the modulation symbols by beamforming weights. Here, the beamforming weights are used for changing a magnitude and phase of a signal, and may be referred to as a 'precoding matrix', a 'precoder', or the like. The digital beamforming unit 404 outputs digital beamformed modulation symbols to a plurality of transmission paths 406-1 to 406-N. In this case, according to a multiple input multiple output (MIMO) transmission technique, modulation symbols may be multiplexed or the same modulation symbols may be provided to the plurality of transmission paths 406-1 to 406-N.

The plurality of transmission paths 406-1 to 406-N convert digital beamformed digital signals into analog signals. To this end, each of the plurality of transmission paths 406-1 to 406-N may include an inverse fast Fourier transform (IFFT) calculator, a cyclic prefix (CP) insertion unit, a DAC, and an up converter. The CP insertion unit is for an orthogonal frequency division multiplexing (OFDM) scheme, and may be excluded in the case that another physical layer scheme (e.g., filter bank multi-carrier (FBMC)) is applied. That is, the plurality of transmission paths 406-1 to 406-N provide an independent signal processing process for a plurality of streams generated through digital beamforming. However, according to an implementation method, some of components of the plurality of transmission paths 406-1 to 406-N may be used in common.

The analog beamforming unit 408 performs beamforming on an analog signal. To this end, the digital beamforming unit 404 multiplies analog signals by beamforming weights. Here, the beamforming weights are used for changing a magnitude and phase of the signal. Specifically, the analog beamforming unit 440 may be variously formed according to a connection structure between the plurality of transmission paths 406-1 to 406-N and antennas. For example, each of the plurality of transmission paths 406-1 to 406-N may be connected to one antenna array. As another example, the plurality of transmission paths 406-1 to 406-N may be connected to one antenna array. As another example, the plurality of transmission paths 406-1 to 406-N may be adaptively connected to one antenna array or may be connected to two or more antenna arrays.

Figure 5:
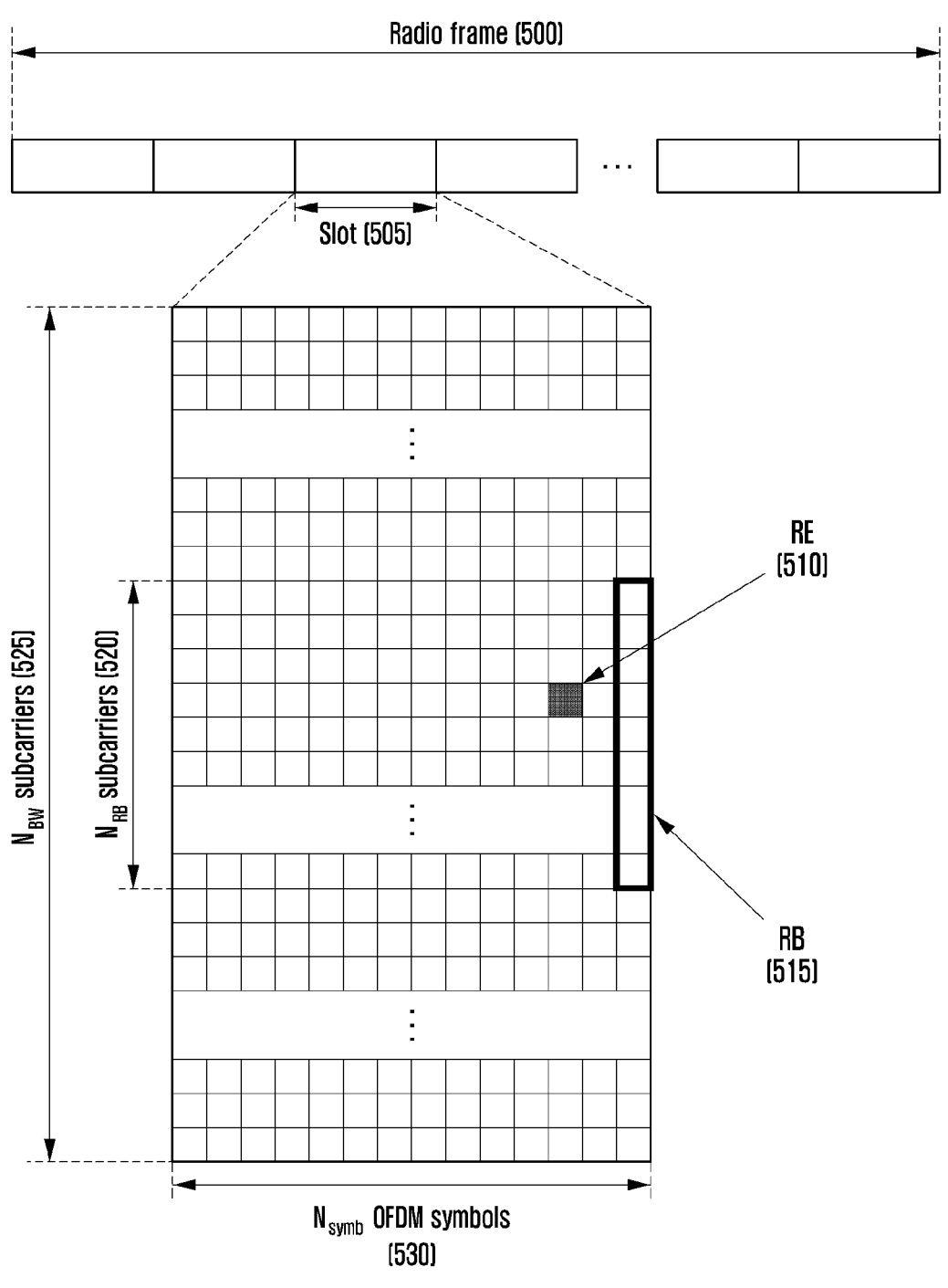
FIG. 5 illustrates a structure of a radio time-frequency resource of a wireless communication system according to an embodiment of the disclosure.

FIG. 5 illustrates a structure of a radio time-frequency resource of a wireless communication system according to an embodiment of the disclosure.

With reference to FIG. 5, in a radio resource region, a horizontal axis represents a time domain, and a vertical axis represents a frequency domain. A minimum transmission unit in the time domain is an OFDM symbol or a DFT-S-OFDM symbol, and the Nsymb number of OFDM symbols or DFT-S-OFDM symbols 530 are included in one slot 505. Unlike the slot, in an NR system, a length of a subframe may be defined as 1.0 ms, and a length of a radio frame 500 may be defined as 10 ms. A minimum transmission unit in the frequency domain is a subcarrier, and a bandwidth of the entire system transmission band may include the total NBW number of subcarriers 525. Specific values such as Nsymb and NBW may be variably applied according to the system.

A basic unit of the time-frequency resource region is a resource element (RE) 510, which may be represented by an OFDM symbol index or a DFT-S-OFDM symbol index and a subcarrier index. A resource block (RB) 515 may be defined as the NRB number of consecutive subcarriers 520 in the frequency domain. In general, a minimum transmission unit of data is an RB unit, and in the NR system, in general, Nsymb=14 and NRB=12.

A structure of a radio time-frequency resource as illustrated in FIG. 5 is applied to a Uu interface.

Hereinafter, a method of processing slice-based system access configuration information according to various embodiments of the disclosure will be described.

One network may provide one or multiple vertical slices and services. Table 1 illustrates examples of vertical slices/services and slice/service type (SST) values of the corresponding slices/services.

TABLE 1

| Slice/Service type (SST) | SST value | Characteristics |
|---|---|---|
| eMBB | 1 | Slice suitable for the handling of 5G enhanced Mobile Broadband. |
| URLLC | 2 | Slice suitable for the handling of ultra-reliable low latency communications. |
| mIoT | 3 | Slice suitable for the handling of massive IoT. |
| V2X | 4 | Slice suitable for the handling of V2X services. |

According to an embodiment of the disclosure, system access configuration information (random access configuration) may be configured for each slice/service.

Figure 6A:
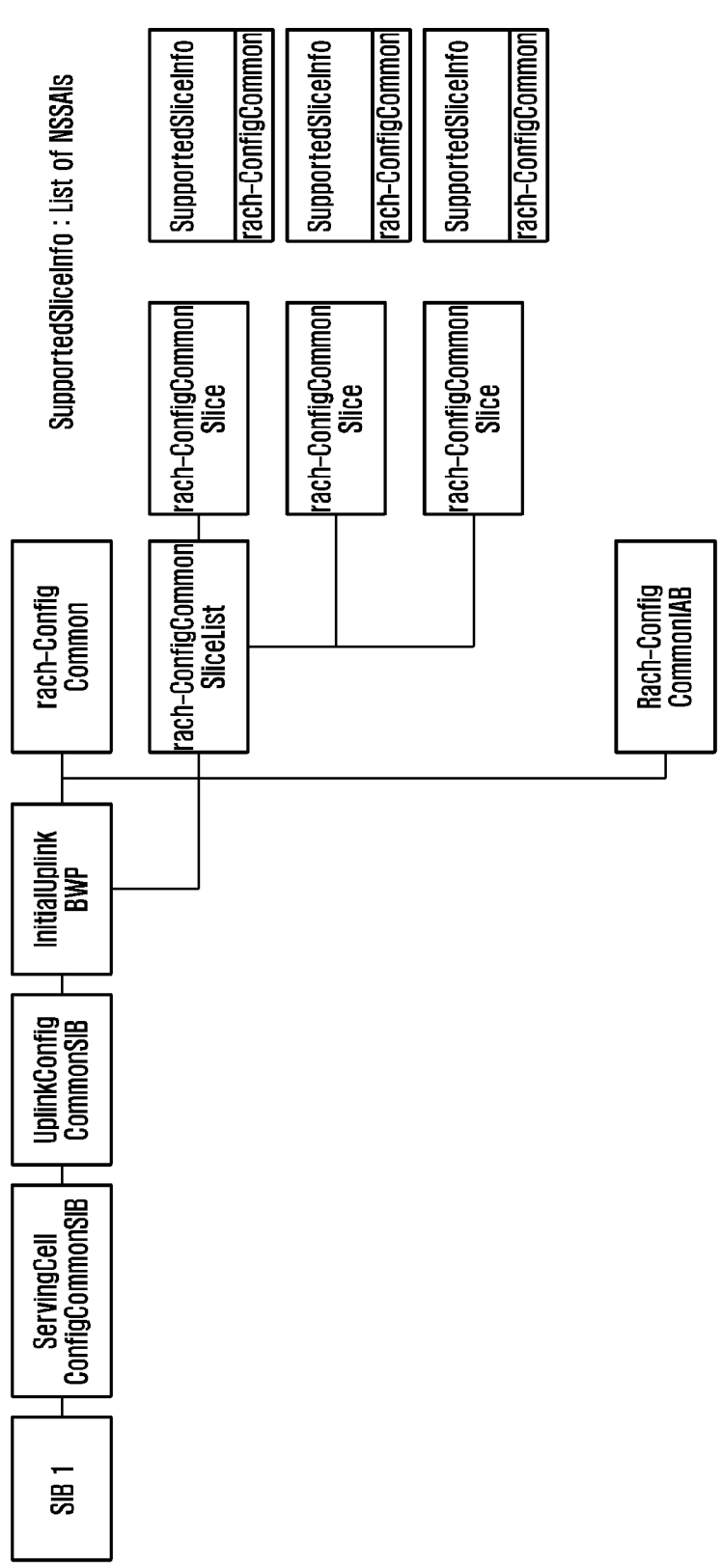
FIGS. 6A and 6B illustrate a constitution of system access configuration information according to an embodiment of the disclosure.
Figure 6B:
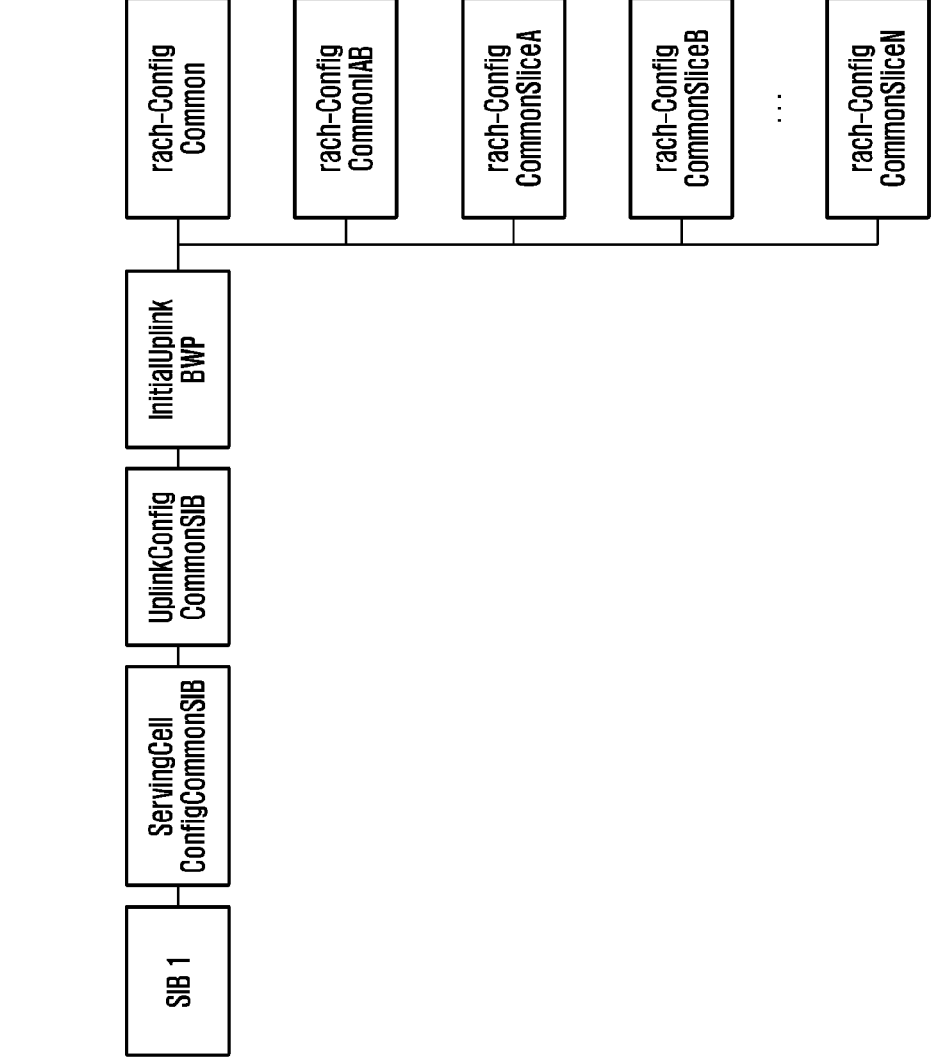

FIGS. 6A and 6B illustrate a constitution of system access configuration information according to an embodiment of the disclosure.

With reference to FIG. 6A, system access configuration information of the terminal may be transmitted while being included in a system broadcast message SIB1. The system broadcast message may include ServingCellConfigCommonSIB information, the Serving CellConfigCommonSIB information may include UplinkConfigCommonSIB information, and the UplinkConfigCommonSIB information may include Initial UplinkBWP information. Further, the InitialUplinkBWP information may include rach-ConfigCommon information, and the rach-ConfigCommon information may include system access configuration information of a general terminal. Parameters included in the rach-Config-Common may include, for example, information in Table 2.

TABLE 2

```
RACH-ConfigCommon ::=              SEQUENCE {
rach-ConfigGeneric                 RACH-ConfigGeneric,
totalNumberOfRA-Preambles          INTEGER (1..63) OPTIONAL,   -- Need S
ssb-perRACH-OccasionAndCB-PreamblesPerSSB            CHOICE {
oneEighth                                            ENUMERATED
{n4,n8,n12,n16,n20,n24,n28,n32,n36,n40,n44,n48,n52,n56,n60,n64},
oneFourth                                            ENUMERATED
{n4,n8,n12,n16,n20,n24,n28,n32,n36,n40,n44,n48,n52,n56,n60,n64},
oneHalf                                              ENUMERATED
{n4,n8,n12,n16,n20,n24,n28,n32,n36,n40,n44,n48,n52,n56,n60,n64},
one                                                  ENUMERATED
{n4,n8,n12,n16,n20,n24,n28,n32,n36,n40,n44,n48,n52,n56,n60,n64},
two                            ENUMERATED {n4,n8,n12,n16,n20,n24,n28,n32},
four                           INTEGER (1..16),
eight                          INTEGER (1..8),
sixteen                        INTEGER (1..4)
} OPTIONAL,   -- Need M
groupBconfigured                   SEQUENCE {
ra-Msg3SizeGroupA                  ENUMERATED {b56, b144, b208, b256, b282, b480, b640,
b800, b1000, b72, spare6, spare5,spare4, spare3, spare2, spare1},
messagePowerOffsetGroupB           ENUMERATED { minusinfinity, dB0, dB5, dB8,
dB10, dB12, dB15, dB18},
numberOfRA-PreamblesGroupA         INTEGER (1..64)
} OPTIONAL,   -- Need R
ra-ContentionResolutionTimer       ENUMERATED { sf8, sf16, sf24, sf32, sf40, sf48,
sf56, sf64},
rsrp-ThresholdSSB              RSRP-Range          OPTIONAL,   -- Need R
rsrp-ThresholdSSB-SUL          RSRP-Range          OPTIONAL,     -- Cond SUL
prach-RootSequenceIndex        CHOICE {
1839                                               INTEGER (0..837),
1139                                               INTEGER (0..137)
},
msg1-SubcarrierSpacing         SubcarrierSpacing   OPTIONAL,   -- Cond
L139
```

TABLE 2-continued

```
restrictedSetConfig                    ENUMERATED  {unrestrictedSet,  restrictedSetTypeA,
restrictedSetTypeB},
msg3-transformPrecoder                 ENUMERATED {enabled} OPTIONAL,   -- Need R
...,
[[
ra-PrioritizationForAccessIdentity              SEQUENCE {
ra-Prioritization-r16                  RA-Prioritization,
ra-PrioritizationForAI-r16              BIT STRING (SIZE (2))
} OPTIONAL,  -- Cond InitialBWP-Only
prach-RootSequenceIndex-r16                                CHOICE {
l571                           INTEGER (0..569),
l1151                          INTEGER (0..1149)
}   OPTIONAL  -- Need R
]]
}
```

The InitialUplinkBWP may include rach-ConfigCommonIAB in which a terminal supporting integrated access and backhaul (IAB) may use when accessing the system. Rach-ConfigCommonIAB is composed of separate information from rach-ConfigCommon of Table 2.

According to an embodiment of the disclosure, system access information for one or multiple slices/services may be configured to use general rach-ConfigCommon information, that is, rach-ConfigCommon of Table 2. The network may form and provide at least one or a combination of a random access channel (RACH) occasion or a physical random access channel (PRACH) preamble to be used for one or multiple slices/services for one or multiple slices/services to the terminal. Slice/service information to which rach-ConfigCommon information is to be applied may be indicated by a rach-ConfigCommonSlice. In this case, a rach-ConfigCommonSliceList may include a slice/service-based system access configuration information list. The rach-ConfigCommonSliceSetList may include one or multiple rach-ConfigCommonSlices. The rach-ConfigCommonSlice may indicate SupportedSliceInfo information including slice/service identification information (NSSAI) and rach-ConfigCommon information to be used by the terminal for the corresponding slice/service slice/service NSSAI and rach-ConfigCommon information to be used by the terminal for the slice/service NSSAI.

The network slice selection assistance information (NS-SAI) or single-network slice selection assistance information (S-NSSAI) may indicate a network slice/service, and be composed of a slice/service type (SST) or an SST and a slice differentiator (SD), as illustrated in Table 3.

tialUplinkBWP information may include rach-ConfigCommon information, and the rach-ConfigCommon information may include system access configuration information of a general terminal. Parameters included in the rach-ConfigCommon are the same as the information in Table 2. The InitialUplinkBWP information may include rach-ConfigCommonIAB information indicating system access configuration information of an IAB terminal. According to an embodiment of the disclosure, the InitialUplinkBWP information may include at least one or a combination of rach-ConfigCommonSliceA information, rach-ConfigCommonSliceB information to rach-ConfigCommonSliceN information indicating system access configuration information of terminals interested in a slice/service A, a slice/service B, or a slice/service N. The rach-ConfigCommonSliceA information, rach-ConfigCommonSliceB information to rach-ConfigCommonSliceN information may be configured independently of the rach-ConfigCommon information of Table 2. Because the method of FIG. 6B should constitute independent system access configuration information for each slice/service, the method of FIG. 6B has a limitation that expandability may decrease when slices/services increase, and that it is difficult to easily support slices/services to be added in the future.

The slice/service-based system access configuration information formed in FIGS. 6A and 6B may configure different RACH resources for one or multiple slices/services. In the other RACH resource, at least one of a time, frequency, power ramping step, scaling factor backoff indicator (BI), or PRACH mask index, or a combination thereof may correspond to different resources. The different RACH

TABLE 3

```
sst: Indicates the S-NSSAI consisting of Slice/Service Type, see 3GPP TS 23.003.
sst-SD :Indicates the S-NSSAI consisting of Slice/Service Type and Slice
Differentiator, see 3GPP TS 23.003.
```

Here, the identification information may be indicated by NSSAI of the corresponding network slice or may be composed of a slice ID mapped to the NSSAI of the corresponding network slice in addition to an identity (ID) of a slice group including the corresponding network slice.

With reference to FIG. 6B, system access configuration information of the terminal may be included in a system broadcast message SIB1 and be transmitted. The system broadcast message may include ServingCellConfigCommonSIB information, the ServingCellConfigCommonSIB information may include UplinkConfigCommonSIB information, and the UplinkConfigCommonSIB information may include InitialUplinkBWP information. Further, the Iniresources may correspond to different bandwidth parts (BWPs). Further, the different RACH resources may correspond to different uplink carriers (NUL/normal uplink, SUL/supplementary uplink). Further, different RACH resources may be mapped to one or multiple network slice selection assistance information (NSSAI). For example, a PRACH resource mask may be mapped to one or multiple slices/service identifiers to distinguish which slice/service NSSAI may use the RACH resource.

In the case that one RACH resource is shared and used by one or more slices, a PRACH resource mask of the same value may be configured to the corresponding slices. The terminal may acquire a RACH resource using the configured PRACH resource mask and perform a system access procedure so as to receive a corresponding slice service. A PRACH resource mask configuration corresponding to each slice to be used for slice-based system access may be transmitted to the terminal through a system broadcast message, transmitted to the terminal through an RRC-dedicated message, or provisioned in advance to the terminal.

The RACH resource for each slice/service may be configured differently from a RACH resource used by a general terminal. That is, a RACH resource indicated in a rach-ConfigCommon including system access information for each slice/service and a RACH resource indicated in a rach-ConfigCommon including general system access information may use different RACH resources. The terminal may perform a system access procedure using a RACH resource configured to the slice/service based on slice/service NSSAI of interest thereof. Here, the RACH resource configured to one or multiple slices/services in which the terminal acquires based on slice/service identification information of interest thereof may include at least one of a RACH occasion, a PRACH preamble, or a combination thereof.

Slice/service-based system access configuration information transmitted through the system broadcast message formed in FIGS. 6A and 6B uses the same RACH resource, but may be configured in a manner that applies different prioritization parameters for each slice/service. The prioritization parameter may be applied to at least one of a power ramping step or a scaling factor BI or a combination thereof. Prioritization parameters may be configured, as illustrated in Table 4.

terminal while including information supported by a public land mobile network (PLMN) to which a cell transmitting the corresponding information belongs. In this case, the rach-ConfigCommonSlice may be transmitted together with related PLMN information (PLMN identifier list).

The terminal may perform a system access procedure using system access configuration information of a rach-ConfigCommonSlice associated with a PLMN corresponding thereto. In this case, the terminal may determine whether to use the rach-ConfigCommonSlice based on a PLMN identifier and a slice/service identifier. If it is determined that the terminal has acquired a rach-ConfigCommonSlice corresponding to a PLMN identifier thereof and a slice/service identifier of interest, the terminal may perform a system access procedure using system access configuration information indicated in the rach-ConfigCommonSlice. If it is determined that the terminal has not acquired a rach-ConfigCommonSlice corresponding to a PLMN identifier thereof, but corresponding to a slice/service identifier of interest, the terminal may perform a system access procedure using system access configuration information indicated in the rach-ConfigCommon.

According to various embodiments of the disclosure, rach-ConfigCommonSlice and rach-ConfigSpecificSlice including system access configuration information on a slice/service may be defined. The rach-ConfigSpecificSlice may be transmitted together with associated slice/service NSSAI. That is, system access configuration information indicated in the rach-ConfigSpecificSlice may be used in the case that the terminal performs a system access procedure in order to receive a slice/service corresponding to the associated slice/service identification information.

TABLE 4

| SupportedSliceInfo: List of NSSAIs |
| --- |
| RA-Prioritization ::=                     SEQUENCE { |
| powerRampingStepHighPriority       ENUMERATED {dB0, dB2, dB4, dB6}, |
| scalingFactorBI     ENUMERATED {zero, dot25, dot5, dot75} OPTIONAL,     -- |
| Need R |
| ... |
| } |

For example, with reference to Table 4, rach-ConfigCommon information may include SupportedSliceInfo information and RA-Prioritization information corresponding thereto. SupportedSliceInfo may include one or multiple slices/service NSSAI, and include at least one of a power ramping step or scaling factor BI configured to one or multiple slices/service NSSAI belonging to SupportedSliceInfo or a combination thereof.

In the case that one cell supports one or more slices/services, system access configuration information including a prioritization parameter to be applied to one or multiple slices/service NSSAI may be formed and provided to the terminal. The terminal may perform a system access procedure using a RACH resource configured to the slice/service based on slice/service identification information of interest thereof. The terminal may perform a system access procedure using a RACH resource and/or prioritization parameter configured to a slice/service based on slice/service identification information of interest thereof. The RACH resource may include at least one of a RACH occasion or a PRACH preamble, or a combination thereof.

According to various embodiments of the disclosure, a rach-ConfigCommonSlice including system access configuration information on a slice/service may be provided to the If it is determined that the terminal has acquired a rach-ConfigSpecificSlice associated with an identifier corresponding to a slice/service of interest thereof, the terminal may perform a system access procedure using system access configuration information indicated in the rach-ConfigSpecificSlice. If it is determined that the terminal has not acquired a rach-ConfigSpecificSlice associated with an identifier corresponding to a slice/service of interest thereof, the terminal may perform a system access procedure using system access configuration information indicated in the rach-ConfigCommonSlice.

According to various embodiments of the disclosure, rach-ConfigCommonSlice and rach-ConfigSpecificSlice including system access configuration information on a slice/service may be defined. The rach-ConfigCommonSlice may be transmitted together with the associated PLMN identification information. That is, when the terminal supporting the corresponding PLMN performs a system access procedure, the rach-ConfigCommonSlice may be used. The rach-ConfigSpecificSlice may be transmitted together with associated slice/service identification information and associated PLMN identification information. That is, system access configuration information indicated in a rach-ConfigSpecificSlice may be used in the case that the terminal supporting the associated PLMN performs a system access procedure in order to receive a slice/service corresponding to the associated slice/service identification information. If it is determined that the terminal has acquired an identifier corresponding to a slice/service of interest thereof and a rach-ConfigSpecificSlice associated with a PLMN identifier thereof, the terminal may perform a system access procedure using system access configuration information indicated in the rach-ConfigSpecificSlice. If it is determined that the terminal has not acquired a rach-ConfigSpecificSlice associated with an identifier corresponding to a slice/service of interest thereof, the terminal may determine whether the terminal has acquired a rach-ConfigCommonSlice associated with a PLMN identifier thereof and perform a system access procedure using system access configuration information indicated in the rach-ConfigCommonSlice corresponding to a PLMN thereof.

The slice/service-based system access configuration information may be provided to a terminal in a radio resource control (RRC) connection state through dedicated RRC signaling, wherein the dedicated RRC signaling may provide slice specific RACH-Dedicated configuration information. RACH-ConfigCommon configuration information of FIGS. 6A and 6B may be not used by the terminal in an RRC connection state, and slice specific RACH-Dedicated configuration information may be used. Slice specific RACH-Dedicated configuration information may configure different RACH resources to one or multiple slices/service NSSAI in the same manner as that of the case of RACH-ConfigCommon of FIGS. 6A and 6B. A RACH resource for one or multiple slices/services may include at least one or a combination of RACH occasions or PRACH preambles configured to one or multiple slices/services.

Table 5 illustrates an example of a method for the terminal to process system access configuration information on slice/service NSSAI of interest thereof.

The network slice selection assistance information of interest configured to the terminal may be composed of only an SST or a combination of an SST and an SD. Identification information indicated in rach-ConfigCommonSlice information including system access configuration information for each slice/service may be composed of only an SST or a combination of an SST and an SD. According to identification information configured to the terminal and identification information configured to system access configuration information for each slice/service, an operation for the terminal to perform system access may vary, as illustrated in Table 5.

TABLE 5

| Slice/service NSSAI of interest of terminal | Slice/service NSSAI indicated in system access configuration information (NSSAI in rach-ConfigCommonSlice) | Terminal operation |
| --- | --- | --- |
| SST | SST | UE's NSSAI consists only with SST. Corresponding NSSAI in rach-ConfigCommonSlice consists only with SST. UE selects the slice specific configuration (rach-ConfigCommonSlice) for access |
| SST | SST + SD | UE's NSSAI consists only with SST. Corresponding NSSAI in rach-ConfigCommonSlice consists with SST and SD |

TABLE 5-continued

| Slice/service NSSAI of interest of terminal | Slice/service NSSAI indicated in system access configuration information (NSSAI in rach-ConfigCommonSlice) | Terminal operation |
| --- | --- | --- |
| | | UE selects the default/legacy configuration (rach-ConfigCommon) |
| SST + SD | SST | UE's NSSAI consists with SST and SD. Corresponding NSSAI in rach-ConfigCommonSlice consists only with SST. UE selects the slice specific configuration (rach-ConfigCommonSlice) for access |
| SST + SD | SST + SD | UE's NSSAI consists with SST + SD. Corresponding NSSAI in rach-ConfigCommonSlice consists with SST and SD. UE selects the slice specific configuration (rach-ConfigCommonSlice) for access |

(1) In the case that identification information configured to the terminal includes only an SST and that identification information indicated by system access configuration information includes only an SST, the terminal may select system access configuration information for each slice/service corresponding to the SST to perform a system access procedure.

(2) In the case that identification information configured to the terminal includes only an SST and that identification information indicated by system access configuration information includes a combination of an SST and an SD, the terminal may select general system access configuration information to perform a system access procedure.

(3) In the case that identification information configured to the terminal includes a combination of an SST and an SD and that identification information indicated by system access configuration information includes only an SST, the terminal may select system access configuration information for each slice/service corresponding to the SST to perform a system access procedure.

(4) In the case that identification information configured to the terminal includes a combination of an SST and an SD and that identification information indicated by the system access configuration information includes a combination of an SST and an SD, the terminal may select system access configuration information for each slice/service corresponding to a combination of an SST and an SD to perform a system access procedure.

Figure 7:
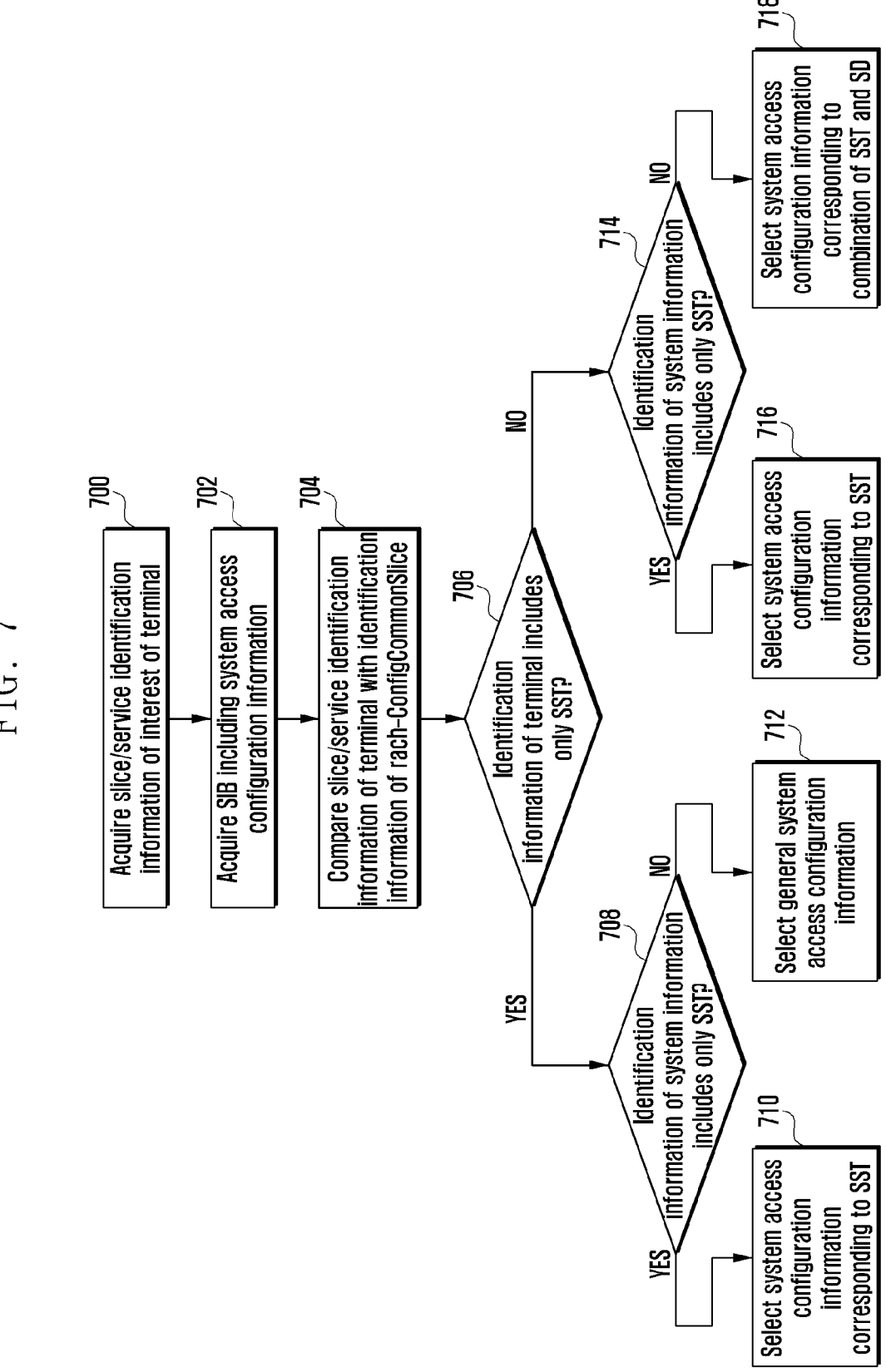
FIG. 7 illustrates an operation of a terminal for processing system access configuration information according to an embodiment of the disclosure.

FIG. 7 illustrates an operation of a terminal for processing system access configuration information according to an embodiment of the disclosure.

With reference to FIG. 7, in step 700, the terminal may acquire NSSAI corresponding to a slice/service of interest thereof. In step 702, the terminal may acquire a system broadcast message to acquire system access configuration information.

If the terminal determines to perform system access using the system access configuration information, in step 704, the terminal may compare slice/service identification information indicated in each slice/service system access configuration information (rach-ConfigCommonSlice) among the slice/service identification information of interest acquired in step 700 and the system access configuration information acquired in step 702.

If it is determined that the slice/service NSSAI acquired in step 700 includes only an SST in step 706, the terminal may determine whether slice/service identification information indicated in a rach-ConfigCommonSlice includes only an SST in step 708. If it is determined that slice/service identification information indicated in a rach-ConfigCommonSlice includes only an SST according to the determination in step 708, the terminal may acquire system access configuration information corresponding to the SST in step 710 and determine to perform a system access procedure using the information. If it is determined that slice/service identification information indicated in a rach-ConfigCommonSlice includes a combination of an SST and an SD according to the determination in step 708, the terminal may determine to perform a system access procedure using general system access configuration information, that is, a RACH-ConfigCommon in step 712.

If it is determined that the slice/service NSSAI acquired in step 700 includes a combination of an SST and an SD in step 706, the terminal may determine whether slice/service identification information indicated in a rach-ConfigCommonSlice includes only an SST in step 714. If it is determined that slice/service identification information indicated in a rach-ConfigCommonSlice includes only an SST according to the determination in step 714, the terminal may acquire system access configuration information corresponding to the SST in step 716, and determine to perform a system access procedure using the information. If it is determined that slice/service identification information indicated in a rach-ConfigCommonSlice includes a combination of an SST and an SD according to the determination in step 714, the terminal may acquire system access configuration information corresponding to a combination of an SST and an SD in step 718 and determine to perform a system access procedure using the information.

For review, the determination steps of steps 704, 706, 708, and 714 exemplarily illustrate a determination process for selecting system access configuration information, and the terminal may perform a system access procedure related to a slice/service of interest thereof based on slice/service NSSAI thereof and system access configuration information regardless of this order.

According to an embodiment of the disclosure, system access configuration information for each slice/service may be configured to be used only in an uplink corresponding to a SUL. General system access configuration information should be configured in an uplink corresponding to a NUL, and may or may not be configured in an uplink corresponding to a SUL. Therefore, there is a need for a method in which the terminal may select the NUL or the SUL and perform a system access procedure based on whether an uplink in which system access configuration information for each slice/service of interest thereof is configured is the NUL or the SUL.

Figure 8:
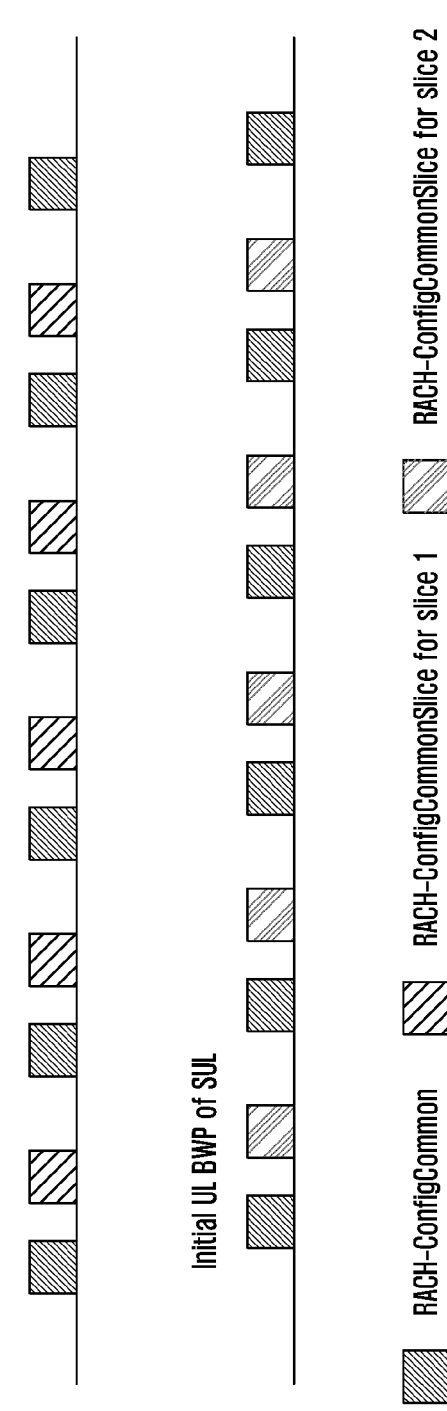
FIG. 8 illustrates a constitution of a NUL uplink and a SUL uplink in which system access configuration information for each slice/service is configured according to an embodiment of the disclosure.

FIG. 8 illustrates a configuration of a NUL uplink and a SUL uplink in which system access configuration information for each slice/service is configured according to an embodiment of the disclosure.

FIG. 8 illustrates a scenario in which system access configuration information on a slice/service 1 is configured to be used in an NUL uplink and in which system access configuration information on a slice/service 2 is configured to be used in an SUL uplink.

An InitialULBWP of an UplinkConfigCommonSIB of the NUL may include general system access configuration information (rach-ConfigCommon) and system access configuration information (rach-ConfigCommonSlice) for each slice/service corresponding to a slice/service 1 The InitialULBWP of UplinkConfigCommonSIB of the SUL may include general system access configuration information (rach-ConfigCommon) and system access configuration information (rach-ConfigCommonSlice) for each slice/service corresponding to a slice/service 2.

The terminal may determine whether there are a NUL and a SUL providing system access configuration information on a slice/service of interest thereof, and determine to perform a system access procedure for receiving a slice/service of interest through the corresponding uplink.

The terminal may determine through which uplink of NUL or SUL should perform a system access procedure based on a reference signal received power (RSRP) measurement value. The terminal may determine whether system access configuration information on a slice/service of interest thereof is provided in the selected uplink based on the RSRP measurement. If system access configuration information on a slice/service of interest is provided in the selected uplink, the terminal may determine to perform a system access procedure using the corresponding information. If system access configuration information on a slice/service of interest is not provided in the selected uplink, the terminal may determine to perform a system access procedure using general system access configuration information. Such a terminal operation will be described with reference to FIG. 9.

If it is determined to the case that the system provides system access configuration information on a slice/service of interest to both the NUL and the SUL or that the system does not provide system access configuration information on a slice/service of interest to both the NUL and the SUL, the terminal may determine to perform system access through the NUL or the SUL based on an RSRP measurement value. If it is determined that both the NUL and the SUL provide system access configuration information on a slice/service of interest, the terminal may determine to perform system access using system access configuration information on a slice/service of interest in the uplink selected based on an RSRP measurement value. If it is determined that both the NUL and the SUL do not provide system access configuration information on a slice/service of interest, the terminal may determine to perform a system access procedure using general system access configuration information in the uplink selected based on an RSRP measurement value. If it is determined that system access configuration information on a slice/service of interest is provided only in one uplink of either the NUL or the SUL, the terminal may determine to perform system access through an uplink that provides system access configuration information on a slice/service of interest. Such a terminal operation will be described with reference to FIG. 10.

Figure 9:
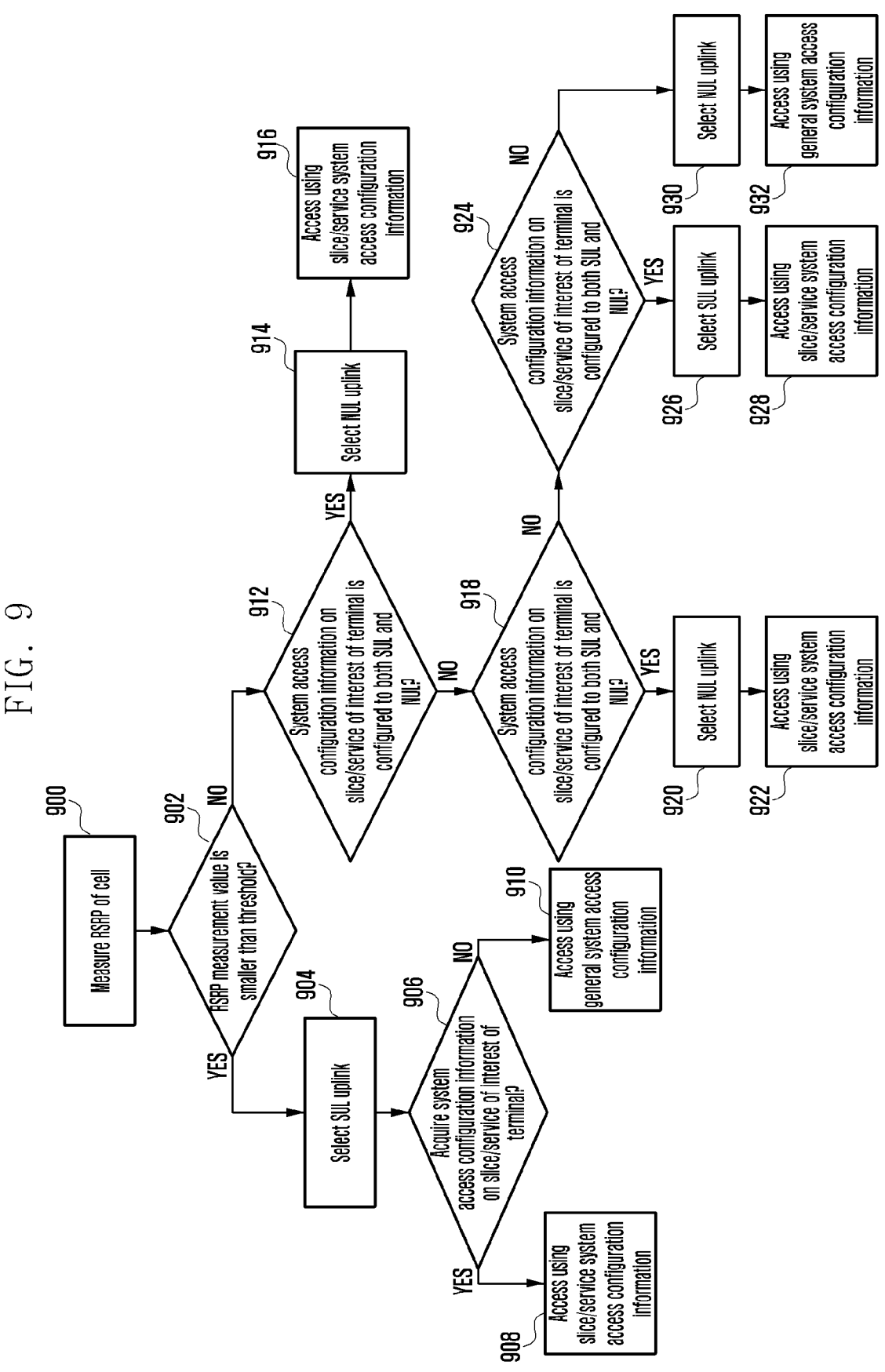
FIG. 9 illustrates an operation of a terminal for selecting a slice/service-based NUL uplink and SUL uplink according to an embodiment of the disclosure.

FIG. 9 illustrates an operation of a terminal for selecting a slice/service-based NUL uplink and SUL uplink according to an embodiment of the disclosure.

With reference to FIG. 9, the terminal may measure a RSRP value of a cell in step 900.

If it is determined that an RSRP measurement value is smaller than the threshold in step 902, the terminal may determine to select the SUL in step 904. In step 906, the terminal may determine whether system access configuration information on a slice/service of interest thereof is configured to the SUL. In this case, the terminal may determine whether configuration information on slice/service NSSAI of interest thereof is included.

If it is determined that system access configuration information on a slice/service of interest of the terminal is configured to the selected SUL, the terminal may perform a system access procedure using system access configuration information on a slice/service in the selected SUL in step 908. If it is determined that system access configuration information on a slice/service is not configured to the selected SUL, the terminal may perform a system access procedure using general system access configuration information in the selected SUL in step 910.

If it is determined that an RSRP measurement value is greater than or equal to the threshold in step 902, the process may proceed to step 912 and the terminal may determine whether system access configuration information on a slice/service of interest thereof is configured to both the SUL and the NUL. If it is determined that system access configuration information on a slice/service is configured to both the SUL and the NUL according to the determination in step 912, the terminal may determine to select the NUL in step 914. In step 916, the terminal may perform a system access procedure using system access configuration information on a slice/service in the selected NUL.

If it is determined that system access configuration information on a slice/service is not configured to both the SUL and the NUL according to the determination in step 912, the terminal may determine whether system access configuration information on a slice/service is configured to the NUL in step 918. Accordingly, the terminal may determine to select the NUL in step 920. The terminal may perform a system access procedure using system access configuration information on a slice/service in the NUL selected in step 922.

If it is determined that system access configuration information on a slice/service is not configured to the NUL in step 918, the terminal may determine whether system access configuration information on a slice/service of interest thereof is configured to the SUL in step 924. Accordingly, the terminal may determine to select the SUL in step 926. The terminal may perform a system access procedure using system access configuration information on a slice/service in the SUL selected in step 928.

If it is determined that system access configuration information on a slice/service is not configured to the SUL in step 924, the terminal may determine that system access configuration information on a slice/service is not configured to both the NUL and the SUL. The terminal may determine to select the NUL in step 930. Accordingly, the terminal may perform a system access procedure using general system access configuration information in the NUL selected in step 932.

Figure 10:
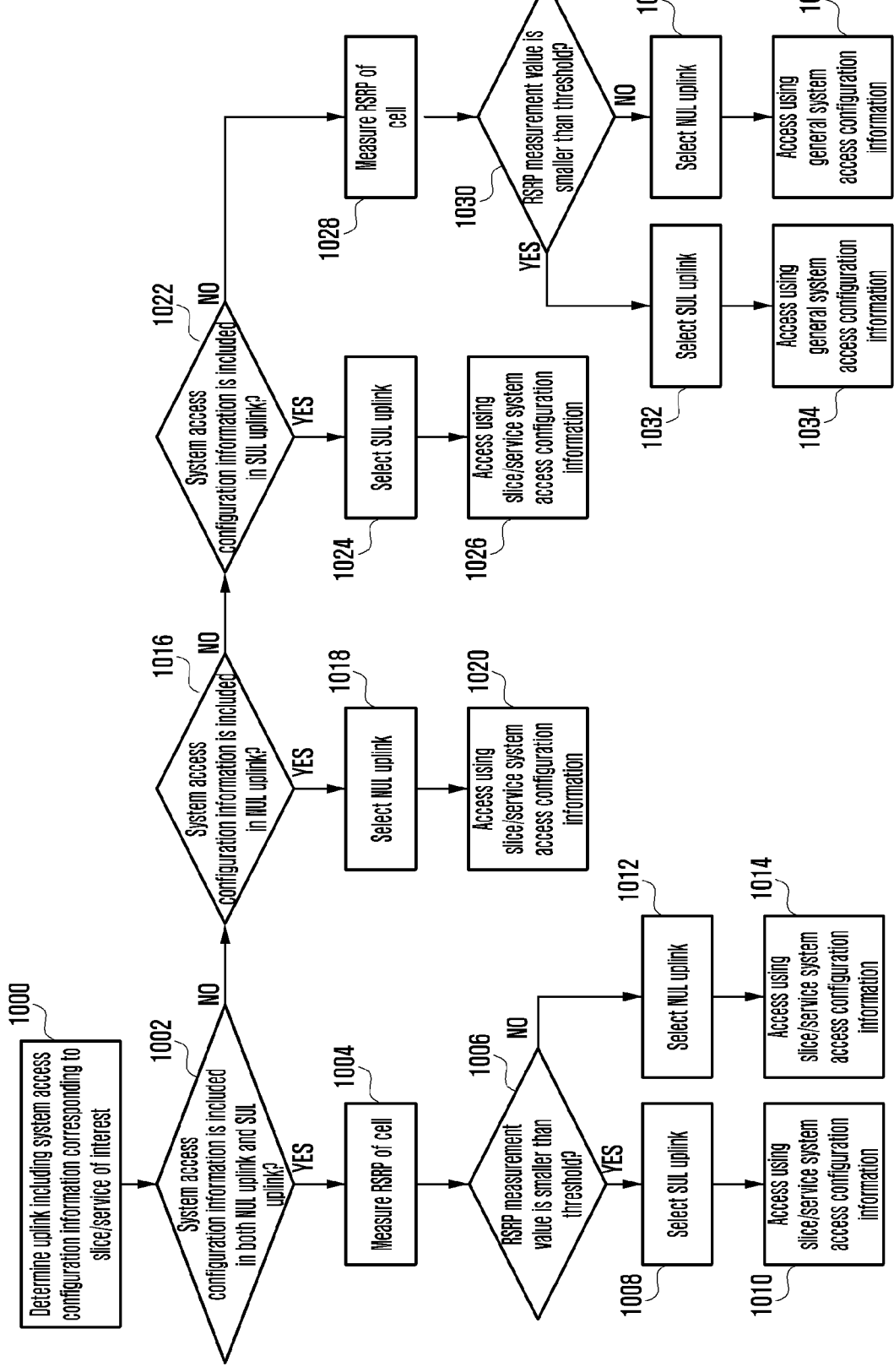
FIG. 10 illustrates an operation of a terminal for selecting a slice/service-based NUL uplink and SUL uplink according to an embodiment of the disclosure.

For review, the determination steps of steps 912, 918 and 924 exemplarily illustrate a determination process on whether system access configuration information on a slice/service of interest of the terminal is configured to the NUL and/or SUL, and according to various embodiments, the terminal may perform the determination procedure regardless of this order. FIG. 10 illustrates an operation of a terminal for selecting a slice/service-based NUL and SUL according to an embodiment of the disclosure.

With reference to FIG. 10, in step 1000, the terminal may determine whether an uplink including system access configuration information corresponding to a slice/service of interest thereof exists. In this case, the terminal may determine whether configuration information on slice/service NSSAI of interest thereof is included.

In step 1002, the terminal may determine whether system access configuration information on a slice/service of interest is configured to both an NUL and an SUL. The terminal may measure an RSRP value of a cell in step 1004. If it is determined that an RSRP measurement value is smaller than a threshold in step 1006, the terminal may determine to select the SUL in step 1008. The terminal may perform a system access procedure using slice/service system access configuration information in the SUL selected in step 1010. If it is determined that an RSRP measurement value is greater than or equal to the threshold in step 1006, the terminal may determine to select the NUL in step 1012. The terminal may perform a system access procedure using slice/service system access configuration information in the NUL selected in step 1014.

If it is determined that system access configuration information on a slice/service of interest is not configured to both the NUL and the SUL in step 1002, the terminal may determine whether system access configuration information on a slice/service of interest is configured to the NUL in step 1016. Accordingly, the terminal may determine to select the NUL in step 1018. The terminal may perform a system access procedure using system access configuration information on a slice/service in the NUL selected in step 1020.

If it is determined that system access configuration information on a slice/service of interest is not configured to the NUL in step 1016, the terminal may determine whether system access configuration information on a slice/service of interest is configured to the SUL in step 1022. The terminal may determine to select the SUL in step 1024. Accordingly, the terminal may perform a system access procedure using system access configuration information on a slice/service in the SUL selected in step 1026.

If it is determined that system access configuration information on a slice/service of interest is not configured to the SUL in step 1022, the terminal may determine that system access configuration information on a slice/service of interest is not configured to both the NUL and the SUL. The terminal may measure RSRP of a cell in step 1028.

If it is determined that an RSRP measurement value is smaller than the threshold in step 1030, the terminal may determine to select the SUL in step 1032. The terminal may perform a system access procedure using general system access configuration information in the selected SUL in step 1034. If it is determined that an RSRP measurement value is greater than or equal to the threshold in step 1030, the terminal may determine to select the NUL in step 1036. The terminal may perform a system access procedure using general system access configuration information in the selected NUL in step 1038.

For review, the determination steps of steps 1012, 1016 and 1022 exemplarily illustrate a determination process on whether system access configuration information on a slice/service of interest of the terminal is configured to the NUL and/or SUL, and according to various embodiments, the terminal may perform the determination procedure regardless of this order.

As an embodiment of the disclosure, in the case of configuring an initial BWP for each slice/service, the terminal may transmit a RACH preamble in an initial BWP corresponding to a slice/service of interest, and stand by to receive a random access response (RAR) message, which is a response thereto in the initial BWP corresponding to the slice/service. The Initial BWP for each slice/service may be configured symmetrically or asymmetrically to a DL and an UL.

According to an embodiment of the disclosure that operates an asymmetric BWP for each slice/service, system access configuration information for each slice/service including a RACH resource and a RACH configuration may be configured in a non-initial BWP. That is, the terminal may perform a system access procedure using system access configuration information on a slice/service of interest thereof in the non-initial BWP.

Restrictions in Table 6 may be applied to rach-Config-Common used when the terminal performs a system access procedure using general system access configuration information.

Figure 11:
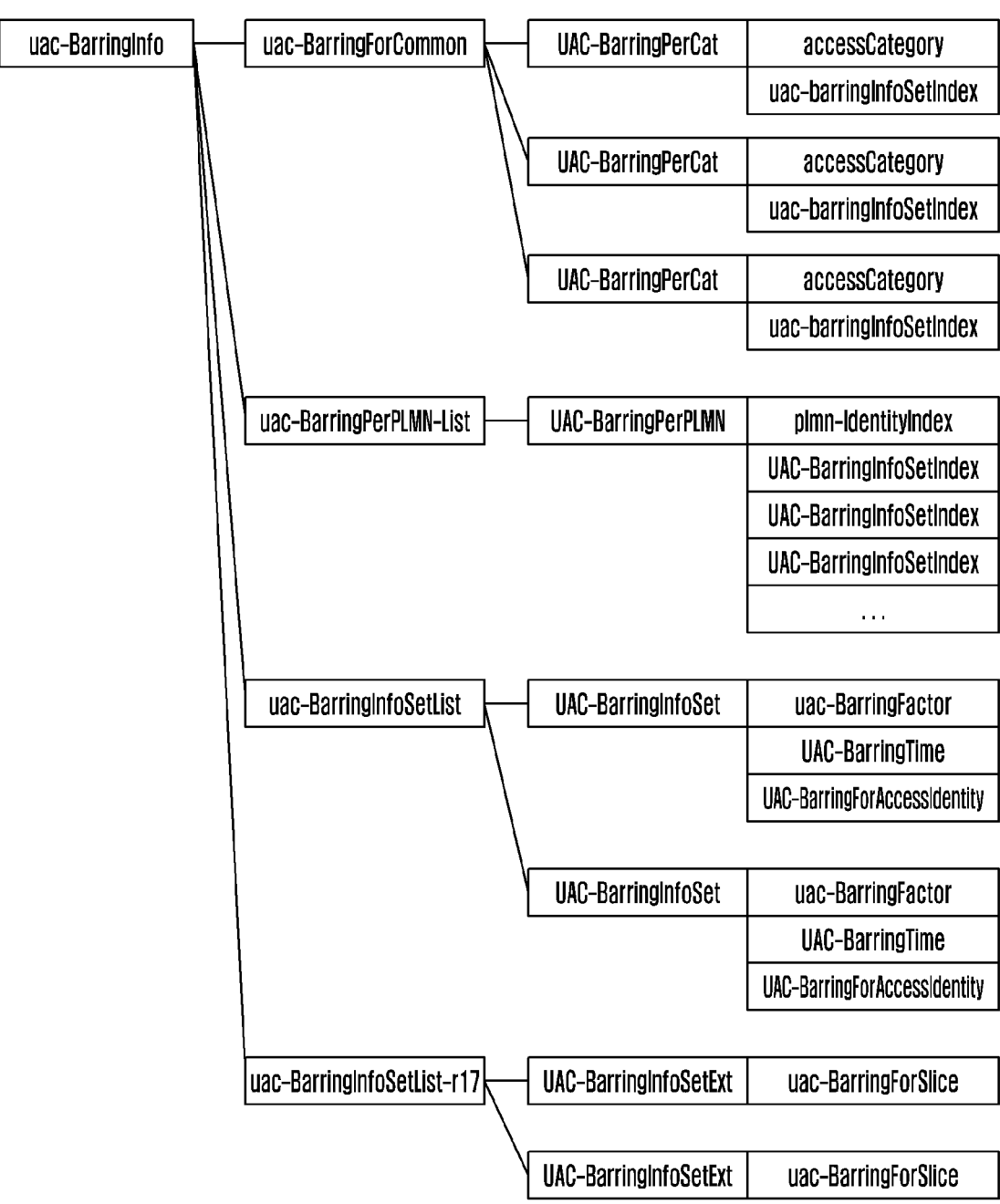
FIG. 11 illustrates a constitution of slice/service-based system access control configuration (unified access control) information according to an embodiment of the disclosure.

With reference to FIG. 11, system access control parameters (UAC parameters) may be hierarchically formed for each category and for each PLMN. The system access control parameter may be configured to a UAC-BarringInfoSet. The UAC-BarringInfoSet may be configured as many as the maximum number of UAC-BarringInfoSetIndexes. The UAC-BarringInfoSetIndex is an index indicating which number of UAC-BarringInfoSet to be applied.

That is, the UAC-BarringInfoSetIndex corresponds to an index indicating an entry of a uac-BarringInfoSetList. For example, the terminal may determine that a UAC-BarringInfoSet corresponding to a first entry of the uac-BarringInfo-

TABLE 6

--- msg1-FrequencyStart: Offset of lowest PRACH transmission occasion in frequency domain with respective to PRB 0.
The value is configured so that the corresponding RACH resource is entirely within the bandwidth of the UL BWP. (see TS 38.211 [16], clause 6.3.3.2).

---

The restrictions in Table 6 are not applied to the case that the terminal performs system access based on system access configuration information for each slice/service using a rach-ConfigCommonSlice.

In the case that the terminal transmits an RACH message 1 (or a first message of step 2 random access) from a non-initial UL bandwidth part (BWP) using system access configuration information on a slice/service of interest, the terminal may determine to receive a response message to the RACH message 1 (or a first message of step 2 random access) in the initial BWP, and stand by in the initial BWP so as to receive the response message.

As described above, by introducing an asymmetric initial BWP that operates differently a UL BWP for transmitting the RACH preamble (or a first message of a second step random access) and a DL BWP for receiving a response message thereto, in the case of using a slice instead of the existing initial BWP having the same DL BW and UL BW, it is possible to secure an uplink transmission capacity for supporting various slices/services using the initial BWP composed of a wider UL bandwidth (BW) and narrow DL BW.

Hereinafter, a method of processing slice-based system access control configuration information according to various embodiments of the disclosure will be described.

In the case that the system operates one or multiple network slices/services, the system may apply and operate separate access control to each network slice/service. In this case, the system may form system access control configuration information including each slice/service NSSAI to which a UAC parameter is to be applied.

FIG. 11 illustrates a constitution of slice/service-based system access control configuration (unified access control (UAC)) information according to an embodiment of the disclosure.

SetList is indicated when the UAC-BarringInfoSetIndex is configured to 1, and that a UAC-BarringInfoSet corresponding to a second entry of a uac-BarringInfoSetList is indicated when a UAC-BarringInfoSetIndex is configured to 2. If the UAC-BarringInfoSetIndex is configured to a value that does not correspond to any entry of the uac-BarringInfoSetList, the terminal may determine that access barring is not applied.

A UAC-BarringPerCat is configuration information configured together with the UAC-BarringInfoSetIndex corresponding to an access category to notify the terminal of which number of UAC-BarringInfoSet to apply to the corresponding access category. A UAC-BarringPerPLMN is configuration information indicating which UAC-BarringInfoSet should be applied to a specific PLMN. If a UAC-BarringPerPLMN is configured and the terminal belongs to the corresponding PLMN, the terminal may determine that configuration information of the UAC-BarringPerPLMN overwrites configuration information of a UAC-BarringPerCat, and apply a UAC-BarringInfoSet corresponding to the UACOBarringInfoSetIndex indicated by the UAC-BarringPerPLMN.

According to an embodiment of the disclosure, in order to operate a system access control configuration for each slice/service, the system may configure a uac-BarringForSlice including a slice/service NSSAI list. The uac-BarringForSlice may be configured in a uac-BarringInfoSetExt, and the uac-BarringInfoSetExt may be configured in a uac-BarringInfoSetList-17, which is an extended form from the existing UAC access control configuration.

Table 7 illustrates a configuration of uac-BarringInfo including a system access control configuration for each slice/service. The uac-BarringInfo may be transmitted while being included in a system broadcast message (e.g., SIB1).

TABLE 7

--- uac-BarringInfo             SEQUENCE {
uac-BarringForCommon     UAC-BarringPerCatList       OPTIONAL,   -- Need S
uac-BarringPerPLMN-List      UAC-BarringPerPLMN-List      OPTIONAL,  --
Need S
uac-BarringInfoSetList    UAC-BarringInfoSetList,
uac-BarringInfoSetList-r17 UAC-BarringInfoSetList-17,
uac-AccessCategory1-SelectionAssistanceInfo CHOICE {
plmnCommon    UAC-AccessCategory1-SelectionAssistanceInfo,
individualPLMNList             SEQUENCE (SIZE (2..maxPLMN)) OF UAC-
AccessCategory1-SelectionAssistanceInfo
} OPTIONAL   -- Need S TABLE 7-continued

```
}
UAC-BarringInfoSetList ::=     SEQUENCE (SIZE(1..maxBarringInfoSet)) OF UAC-
BarringInfoSet
UAC-BarringInfoSet ::=     SEQUENCE {
uac-BarringFactor   ENUMERATED {p00, p05, p10, p15, p20, p25, p30, p40,
p50, p60, p70, p75, p80, p85, p90, p95},
uac-BarringTime       ENUMERATED {s4, s8, s16, s32, s64, s128, s256, s512},
uac-BarringForAccessIdentity BIT STRING (SIZE(7))
}
UAC-BarringInfoSetList-r17 ::=   SEQUENCE (SIZE(1..maxBarringInfoSet)) OF
UAC-BarringInfoSetExt
UAC-BarringInfoSetExt ::=   SEQUENCE {
uac-BarringForSlice   UAC-BarringForSlice
}
UAC-BarringForSlice :: = SEQUENCE {
appliedSlice SEQUENCE (SIZE(1..maxNSSAI)) OF S-NSSAI
}
UAC-BarringInfoSetIndex ::= INTEGER (1..maxBarringInfoSet)
UAC-AccessCategory1-SelectionAssistanceInfo ::=       ENUMERATED {a, b, c}
uac-AccessCategory1-SelectionAssistanceInfo
Information used to determine whether Access Category 1 applies to the UE, as
defined in 3GPP TS 22.261.
uac-BarringForCommon
Common access control parameters for each access category. Common values are used
for all PLMNs, unless overwritten by the PLMN specific configuration provided in
uac-BarringPerPLMN-List. The parameters are specified by providing an index to the
set of configurations (uac-BarringInfoSetList).
```

The UAC-BarringForSlice may include one or multiple slice/service NSSAI to which a slice/service-based system access control configuration is to be applied. A UAC-BarringInfoSetIndex indicating an UAC-BarringInfoSet entry of the system access control configuration, that is, a uac-BarringInfoSetList, may be associated and operated with the slice/service-based system access control configuration, that is, a UAC-BarringInfoSetExt of uac-BarringInfoSetList-r17. The uac-BarringForSlice may be configured to a value equal to or smaller than a value corresponding to the UAC-BarringInfoSetIndex. If it is determined that a uac-BarringForSlice corresponding to a UAC-BarringInfoSetIndex is configured, the terminal may determine that it should apply a UAC-BarringInfoSet indicated by the UAC-BarringInfoSetIndex to a slice/service corresponding to the uac-BarringForSlice to perform system access. If it is determined that a uac-BarringForSlice corresponding to the UAC-BarringInfoSetIndex is not configured, the terminal may determine that it should apply a UAC-BarringInfoSet indicated by the UAC-BarringInfoSetIndex regardless of the slice/service to perform system access.

If UAC-BarringForSlice information is not configured to a specific UAC-BarringInfoSetIndex (it is determined that a UAC-BarringForSlice is empty), the terminal may determine that a system access control configuration of a UAC-BarringInfoSet may be applied to all slices/services. If UAC-BarringForSlice information is configured to a specific UAC-BarringInfoSetIndex (it is determined that UAC-BarringForSlice is non-empty), the terminal may determine that a system access control configuration of the UAC-BarringInfoSet may be applied only to slice/service NSSAI included in the UAC-BarringForSlice.

Figure 12:
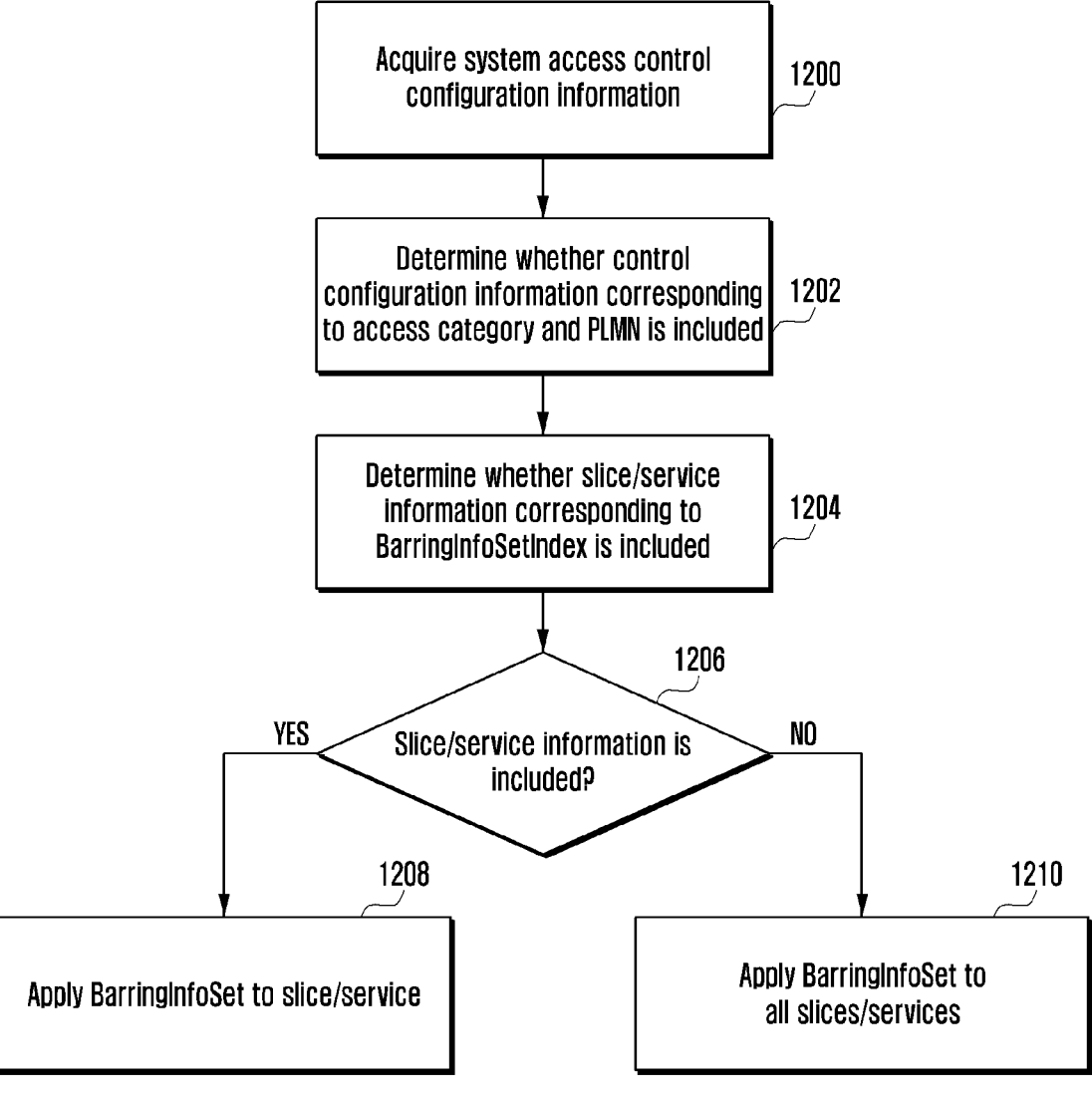
FIG. 12 illustrates an operation of a terminal for processing a slice/service-based system access control configuration according to an embodiment of the disclosure.

FIG. 12 illustrates an operation of a terminal for processing a slice/service-based system access control configuration according to an embodiment of the disclosure.

With reference to FIG. 12, the terminal may acquire system access control configuration information (uac-BarringInfo) in step 1200.

In step 1202, the terminal may determine whether at least one or a combination of system access control configuration information (uac-BarringPerCat) corresponding to an access category or system access control configuration information (uac-BarringPerPLMN) corresponding to a PLMN is included.

If it is determined that system access control configuration information corresponding to a PLMN corresponding to the terminal is included, the terminal may determine that a uac-BarringPerPLMN overwrites a uac-BarringPerCat. The terminal may determine a uac-BarringInfoSetIndex corresponding to a uac-BarringPerCat and a uac-BarringPerPLMN.

In step 1204, the terminal may determine whether slice/service information corresponding to a uac-BarringInfoSetIndex is included. If it is determined that slice/service information (UAC-BarringForSlice) corresponding to a uac-BarringInfoSetIndex exists in step 1206, the terminal may determine to apply a uac-BarringInfoSet indicated by a uac-BarringInfoSetIndex to the slice/service in step 1208. The terminal may perform a system access procedure based on system access control configuration information of the uac-BarringInfoSet. If it is determined that slice/service information (UAC-BarringForSlice) corresponding to a uac-BarringInfoSetIndex does not exist in step 1206, the terminal may determine to apply the uac-BarringInfoSet indicated by the uac-BarringInfoSetIndex to all slices/services in step 1210. The terminal may perform a system access procedure based on system access control information of the uac-BarringInfoSet.

According to an embodiment of the disclosure, the terminal may determine whether a UAC-BarringForPLMN including a PLMN thereof is included in the system access configuration control information. If it is determined that a UAC-BarringForPLMN corresponding to a PLMN thereof is included, the terminal may determine a UAC-BarringInfoSetIndex value indicated by the UAC-BarringForPLMN. The terminal may determine whether the UAC-BarringForSlice corresponding to the UAC-BarringInfoSetIndex is configured.

If it is determined that the UAC-BarringForSlice corresponding to the UAC-BarringInfoSetIndex is configured, the terminal may determine to perform the system access procedure using system access control information corresponding to the UAC-BarringInfoSet indicated by the UAC-BarringInfoSetIndex for the corresponding slice/service. If it is determined that the UAC-BarringForSlice corresponding to the UAC-BarringInfoSetIndex indicated by the UAC-BarringForPLMN is not configured, the terminal may determine to perform a system access procedure using system access control information corresponding to the UAC-BarringInfoSet indicated by the UAC-BarringInfoSetIndex for all slices/services. If it is determined that the UAC-BarringForPLMN including a PLMN thereof is not configured to the system access configuration control information, the terminal may determine whether a UAC-BarringForSlice corresponding to the UAC-BarringInfoSetIndex configured to the UAC-BarringForCat is configured. If it is determined that a UAC-BarringForSlice corresponding to the uac-BarringInfoSetIndex is included, the terminal may determine to perform a system access procedure using system access control information corresponding to a UAC-BarringInfoSet indicated by a uac-BarringInfoSetIndex for a slice/service indicated by the UAC-BarringForSlice. If it is determined that a UAC-BarringForSlice corresponding to the UAC-BarringInfoSetIndex indicated by the UAC-BarringForCat is not configured, the terminal may determine to perform the system access procedure using system access control information corresponding to the UAC-BarringInfoSet indicated by the UAC-BarringForCat for all slices/services.

According to an embodiment of the disclosure, if it is determined that a UAC-BarringForSlice including slice/service NSSAI of the terminal is configured, the terminal may determine that a uac-BarringPerCat and a uac-BarringPerPLMN are overwritten by the UAC-BarringForSlice and apply the UAC-BarringInfoSet indicated by the uac-BarringInfoSetIndex corresponding to the UAC-BarringForSlice to perform the system access procedure.

According to an embodiment of the disclosure, if it is determined that a UAC-BarringForSlice including slice/service NSSAI of the terminal is configured, the terminal may determine whether uac-BarringPerPLMN is configured, and in the case that there is configuration information including the PLMN of the terminal, the terminal may determine that the UAC-BarringForSlice overwrites the uac-BarringPerPLMN, and apply the UAC-BarringInfoSet indicated by the uac-BarringInfoSetIndex to perform the system access procedure. If it is determined that the uac-BarringPerPLMN including a PLMN thereof is not configured, the terminal may determine that the UAC-BarringForSlice overwrites the uac-BarringPerCat, and apply the UAC-BarringInfoSet indicated by the uac-BarringInfoSetIndex corresponding to the UAC-BarringForSlice to perform the system access procedure.

According to an embodiment of the disclosure, if it is determined that a UAC-BarringForSlice including slice/service NSSAI of the terminal is not configured, the terminal may determine whether a uac-BarringPerPLMN is configured, and in the case that there is configuration information including the PLMN of the terminal, the terminal may determine that a uac-BarringPerPLMN overwrites a uac-BarringPerCat and apply a UAC-BarringInfoSet indicated by a uac-BarringInfoSetIndex to perform the system access procedure. If it is determined that a uac-BarringPerPLMN including a PLMN thereof is not configured, the terminal may apply a UAC-BarringInfoSet indicated by a uac-BarringInfoSetIndex corresponding to a uac-BarringPerCat to perform a system access procedure.

Table 8 illustrates an operation of an access category parameter of a system access control configuration.

TABLE 8

| Access Category number | Conditions related to UE | Type of access attempt |
|---|---|---|
| 0 | All | MO signalling resulting from paging |
| 1 | UE is configured for delay tolerant service and subject to access control for Access Category 1, which is judged based on relation of UE's HPLMN and the selected PLMN. | All except for Emergency, or MO exception data |
| 2 | All | Emergency |
| 3 | All except for the conditions in Access Category 1. | MO signalling on NAS level resulting from other than paging |
| 4 | All except for the conditions in Access Category 1. | MMTEL voice |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories |
| 8 | All except for the conditions in Access Category 1 | MO signalling on RRC level resulting from other than paging |
| 9 | All except for the conditions in Access Category 1 | MO IMS registration related signalling |
| 10 | All | MO exception data |
| 11-31 | | Reserved standardized Access Categories |
| 32-63 | All | Based on operator classification |

An access category to be configured to each slice/service may, for example, use values of 32 to 63 reserved for use by the operator. A service provider may perform a function of configuring an access category value for a supporting slice/service. This may be handled by the system implementation. An access category value for a slice/service configured by the service provider may be transmitted to the terminal.

In the case that the network may support one or multiple slices/services to one or multiple terminals, the network may configure which frequency or cell to allow data transmission and reception for a slice/service of which terminal based on a slice/service requested by the terminal (list of requested S-NSSAI) and slices/services that may be supported in frequencies or cells (list of allowed S-NSSAI). When the network provides one or multiple slices/services (S-NSSAI) configuration information supported by at least one or a combination of frequencies or cells to the terminal, the network may use a system broadcast message and a paging message in addition to RRC dedicated messages.

For example, the paging message transmitted by the network may include a mobile terminated (MT) service indication and MT service slice information corresponding to at least one terminal in an RRC_IDLE state or an RRC_INACTIVE state. The MT service slice information is at least one or a combination of an MT service indicator, MT service slice identification information (identifier), a frequency in which the terminal may perform an MT service access procedure, a cell in which the terminal may perform an MT service access procedure, a priority of the frequency in the case that there is one or more frequency capable of performing an MT service, or a priority of a cell in the case that there is one or more cell capable of performing the MT service. The MT slice identification information may be represented as a list of entire S-NSSAI identifiers, that is, a list of SSTs or a list of SSTs and SDs, as illustrated in Table 5.

In the case that the paging message includes the entire S-NSSAI identifier corresponding to the MT slice, an overhead of the paging message may increase. As a method of configuring MT slice identification information capable of reducing an overhead of the paging message, the network may use an index or bitmap method. Here, the MT slice identification information may be represented as an index of an allowed slice (allowed S-NSSAI) list to the corresponding terminal. Further, the MT slice identification information may be represented as a bitmap of a slice (allowed S-NS-SAI) list allowed to the corresponding terminal. For example, assuming that the maximum number of allowed S-NSSAI configurable to the terminal is 8, MT slice identification information indicated in the paging message may be represented by 3 bits and be configured to an index value corresponding to the MT slice. For another example, assuming that the maximum number of allowed S-NSSAI that may be configured to the terminal is 8, MT slice identification information indicated in the paging message may be represented as an 8-bit bitmap, and a bit value corresponding to the MT slice in the bitmap may be configured to 1.

In order to determine slice information corresponding to a mobile terminated (MT) service in an RRC_IDLE state or an RRC_INACTIVE state, the terminal may receive a configuration of an allowed S-NSSAI list including mobile terminated (MT) service slice identification information from the network before entering the RRC_IDLE state or the RRC_INACTIVE state. In the RRC_IDLE state or RRC_I-NACTIVE state, in order to determine slice information corresponding to the MT service, the terminal may receive a configuration of an allowed slice (allowed S-NSSAI) list including MT service slice identification information from the network while performing a tracking area update (TAU) procedure.

When the terminal receives a paging message from the network in an RRC_IDLE state or an RRC_INACTIVE state and determines that an MT service is instructed thereto, the terminal may acquire MT service slice information from the paging message. The MT service slice information acquired by the terminal is at least one or a combination of an MT service indicator, MT service slice identification information, a frequency in which the terminal may perform an MT service access procedure, a cell in which the terminal may perform the MT service access procedure, a priority of a frequency in the case that there is one or more frequency that may perform an MT service, or a priority of a cell in the case that there is one or more cell that may perform an MT service.

The MT slice identification information may be represented as the entire S-NSSAI list, that is, a list of SSTs or a list of SSTs and SDs, as illustrated in Table 5. The terminal may determine S-NSSAI corresponding to the MT service slice based on allowed S-NSSAI list information configured by the network, and perform an MT service access procedure with reference to other configuration information (frequency, cell, priority) corresponding to the S-NSSAI.

In the case that the MT slice identification information is configured to an index of the allowed S-NSSAI list to the terminal, for example, assuming that the maximum number of allowed S-NSSAI configurable to the terminal is 8, MT slice identification information indicated in the paging message may be represented by 3 bits and be configured to an index value corresponding to an MT slice. The terminal may determine an index of a slice (S-NSSAI) corresponding to the MT service slice based on allowed S-NSSAI list information configured by the network, and perform an MT service access procedure with reference to other configuration information (frequency, cell, priority) of the corresponding slice.

In the case that MT slice identification information is configured to a bitmap of an allowed S-NSSAI list to the terminal, for example, assuming that the maximum number of allowed S-NSSAI configurable to the terminal is 8, MT slice identification information indicated in the paging message may be represented in an 8-bit bitmap, and a bit value corresponding to an MT slice in the bitmap may be configured to 1. The terminal may determine whether a bit position and bit value of a slice (S-NSSAI) corresponding to an MT service slice are configured to 1 based on allowed S-NSSAI list information configured by the network, and perform an MT service access procedure with reference to other configuration information (frequency, cell, priority) of the corresponding slice.

In the above description, an example of indicating an MT service slice of the terminal in the paging message has been described, but it is equally applicable even to the case of configuring a mobile oriented service (MO service) slice of the terminal in the paging message. The network and the terminal indicate and determine slice identification information (represented as the entire S-NSSAI identifier, an index of the S-NSSAI, and an S-NSSAI bitmap) corresponding to the MO service in an allowed S-NSSAI list, and perform a service access procedure in a frequency or cell corresponding to the MO service.

Hereinafter, transmission of random access configuration information according to an embodiment of the disclosure and an operation in which a terminal that has received the random access configuration information performs a random access procedure will be briefly described.

Figure 13:
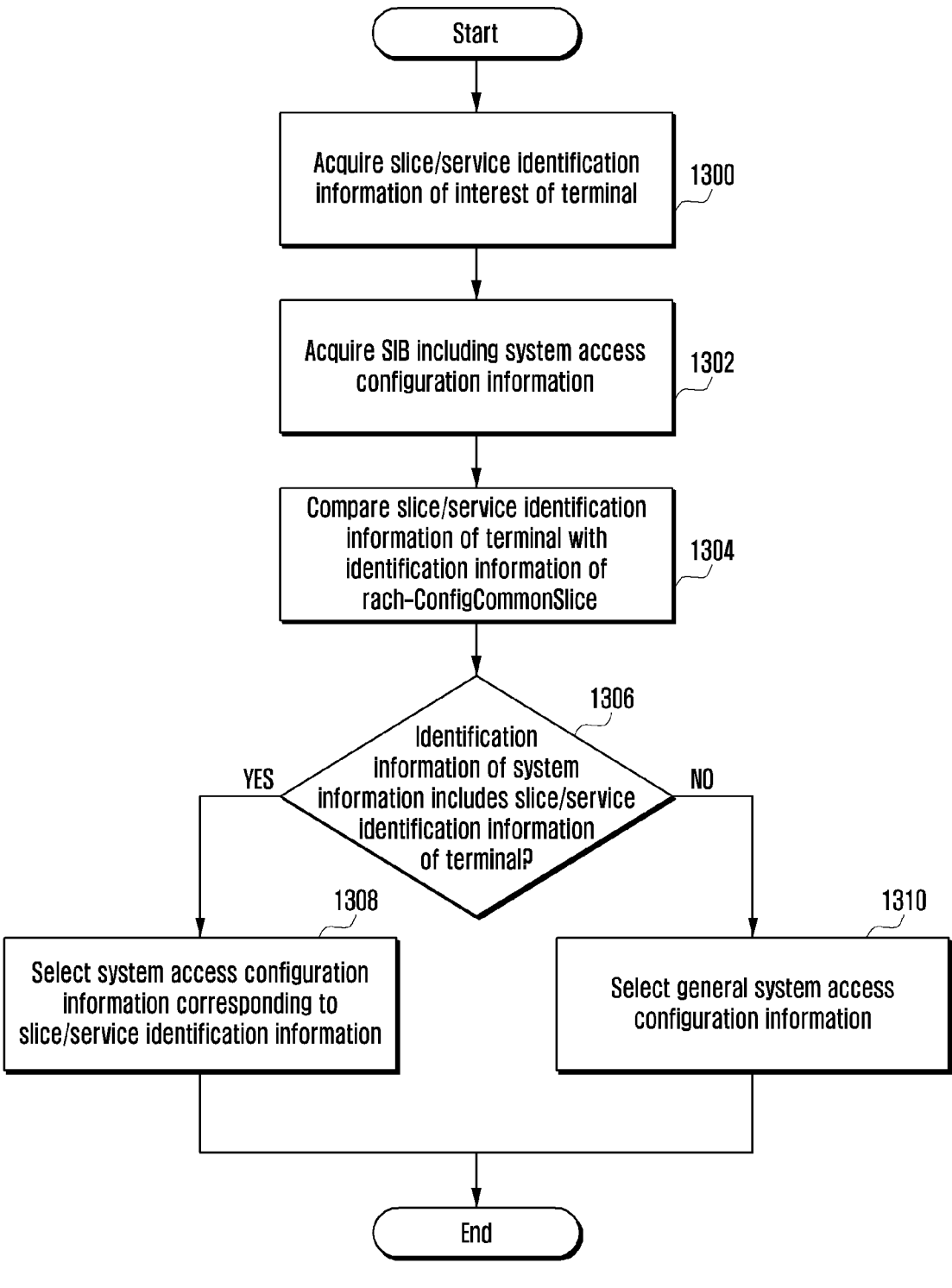
FIG. 13 is a flowchart illustrating a procedure for performing random access of a terminal according to an embodiment of the disclosure.

FIG. 13 is a flowchart illustrating a procedure for performing random access of a terminal according to an embodiment of the disclosure.

With reference to FIG. 13, the terminal may acquire identification information related to a service to receive (step 1300). Here, the identification information is information for identifying a slice/service in which the terminal is interested, and as described above, the identification information may be, for example, network slice selection assistance information (NSSAI) for a specific network slice, and as another example, the identification information may be an identity (ID) of a specific slice corresponding to the NSSAI or an ID of a slice group including at least one slice.

In this way, when identification information is acquired, the terminal may acquire a system information block (SIB) including configuration information for accessing the system (step 1302). Here, configuration information for accessing the system may include both access configuration information (e.g., rach-configcommonslice) related to a specific network slice or service and access configuration information (rach-configcommon) for general network access.

The terminal may compare previously acquired slice/service identification information with configuration information for system access included in the SIB. For example, if a rach-configcommonslice as configuration information for system access is included in the SIB, the terminal may identify whether identification information of a slice corresponding to the rach-configcommonslice includes service/slice identification information previously acquired by the terminal (step 1306). In describing this operation, random access configuration information is specified as a rach-configcommonslice, but as described above with reference to FIGS. 6A and 6B, a name or field value of random access configuration information may be variously configured.

Based on such comparison, for example, if slice/service identification information previously acquired by the terminal is included in identification information identified by the terminal in the random access configuration information, the terminal may select the corresponding random access configuration information (step 1308) and thus perform a random access procedure.

As another example, if slice/service identification information previously acquired by the terminal is not included in identification information identified by the terminal in random access configuration information, the terminal may select general access configuration information included together in the system information (step 1310) to perform a general random access procedure.

FIG. 14 is a flowchart illustrating an operation of transmitting random access configuration information of a base station according to an embodiment of the disclosure.

The base station according to an embodiment of the disclosure may identify a slice/service capable of supporting in a cell (step 1400).

When a supportable slice/service is identified, the base station may generate system access configuration information corresponding to identification information of the identified slice/service (step 1402).

The base station may generate an SIB including system access configuration information corresponding to slice/service identification information and system access configuration information for general random access (step 1404), and then transmit the generated SIB (step 1406).

For example, system access configuration information corresponding to slice/service identification information may be, for example, a rach-configcommonslice, as described above with reference to FIGS. 6A and 6B. Further, system access configuration information for general random access may be, for example, a rach-configcommon.

In this way, after the SIB is transmitted, the base station may receive a random access preamble based on the SIB from the terminal (step 1408). For example, the random access preamble may request system access related to a specific slice/service or may request general system access.

Methods according to the embodiments described in the claims or specifications of the disclosure may be implemented in the form of hardware, software, or a combination of hardware and software.

In the case of being implemented in software, a computer readable storage medium storing one or more programs (software modules) may be provided. One or more programs stored in the computer readable storage medium are configured for execution by one or more processors in an electronic device. The one or more programs include instructions for causing an electronic device to execute methods according to embodiments described in the claims or specifications of the disclosure.

Such programs (software modules, software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), another form of optical storage device, or a magnetic cassette. Alternatively, the programs may be stored in a memory formed with a combination of some or all thereof. Further, each constitution memory may be included in the plural.

Further, the program may be stored in an attachable storage device that may access through a communication network such as the Internet, Intranet, local area network (LAN), wide LAN (WLAN), or storage area Network (SAN), or a communication network formed with a combination thereof. Such a storage device may access a device implementing an embodiment of the disclosure through an external port. Further, a separate storage device on the communication network may access the device implementing the embodiment of the disclosure.

In the specific embodiments of the disclosure described above, components included in the disclosure were expressed in the singular or plural according to presented specific embodiments. However, the singular or plural expression is appropriately selected for a situation presented for convenience of description, and the disclosure is not limited to the singular or plural components, and even if a component is represented in the plural, it may be composed of the singular, or even if a component is represented in the singular, it may be composed of the plural.

In the detailed description of the disclosure, although specific embodiments have been described, various modifications are possible without departing from the scope of the disclosure. Therefore, the scope of the disclosure should not be limited to the described embodiments and should be defined by the claims described below as well as by those equivalent to the claims.

The invention claimed is:

1. A method performed by a base station in a wireless communication system, the method comprising:

transmitting, to a terminal, a system information block type 1 (SIB1) including configuration information on an initial uplink bandwidth part (BWP), the configuration information including a first random access channel (RACH) configuration associated with a plurality of network slices and a second RACH configuration associated with a general random access, the first RACH configuration including identification information for identifying a set of network slices among the plurality of network slices, first information on a random access resource corresponding to the plurality of network slices, and second information including a parameter for random access prioritization corresponding to the plurality of network slices, the parameter including a power ramping step; and receiving, from the terminal, a random access preamble associated with the set of network slices, based on the first information and the second information, wherein the set of network slices is associated with one or more single-network slice selection assistance information (S-NSSAIs).

2. The method of claim 1, wherein the first information includes information on at least one random access preamble and information on a mask index for determining a RACH occasion where the random access preamble is received.

3. The method of claim 1, wherein the parameter further includes a scaling factor for a backoff indicator (BI).

4. A method performed by a terminal in a wireless communication system, the method comprising:

receiving, from a base station, a system information block type 1 (SIB1) including configuration information on an initial uplink bandwidth part (BWP), the configuration information including a first random access channel (RACH) configuration associated with a plurality of network slices and a second RACH configuration associated with a general random access, the first RACH configuration including identification information for identifying a set of network slices among the plurality of network slices, first information on a random access resource corresponding to the plurality of network slices, and second information including a parameter for random access prioritization corresponding to the plurality of network slices, the parameter including a power ramping step; and transmitting, to the base station, a random access preamble associated with the set of network slices, based on the first information and the second information, wherein the set of network slices is associated with one or more single-network slice selection assistance information (S-NSSAIs).

5. The method of claim 4, wherein the first information includes information on at least one random access preamble and information on a RACH occasion.

6. The method of claim 4, wherein the parameter further includes a scaling factor for a backoff indicator (BI).

7. A base station in a wireless communication system, the base station comprising:

a transceiver; and a controller configured to:

control the transceiver to transmit, to a terminal, a system information block type 1 (SIB1) including a configuration, included in an initial uplink bandwidth part (BWP) of the SIB 1, comprising a first random access channel (RACH) configuration associated with a plurality of network slices and a second RACH configuration associated with a general random access, the first RACH configuration including identification information for identifying a set of network slices among the plurality of network slices, first information on a random access resource corresponding to the plurality of network slices, and second information including at least one parameter for random access prioritization associated with the set of network slices among the plurality of network slices, the at least one parameter including a power ramping step and a backoff indicator (BI), and control the transceiver to receive, from the terminal, a random access preamble associated with the set of network slices, based on the first information and the second information, wherein the set of network slices is associated with one or more single-network slice selection assistance information (S-NSSAIs).

8. The base station of claim 7, wherein the first information includes information on at least one random access preamble and information on a RACH occasion.

9. A terminal in a wireless communication system, the terminal comprising:

a transceiver; and a controller configured to:

control the transceiver to receive, from a base station, a system information block type 1 (SIB1) including a configuration, included in an initial uplink bandwidth part (BWP) of the SIB 1, comprising a first random access channel (RACH) configuration associated with a plurality of network slices and a second RACH configuration associated with a general random access, the first RACH configuration including identification information for identifying a set of network slices among the plurality of network slices, first information on a random access resource corresponding to the plurality of network slices, and second information including at least one parameter for random access prioritization associated with the set of network slices among the plurality of network slices, the at least one parameter including a power ramping step and a backoff indicator (BI), and control the transceiver to transmit, to the base station, a random access preamble associated with the set of network slices, based on the first information and the second information, wherein the set of network slices is associated with one or more single-network slice selection assistance information (S-NSSAIs).

10. The terminal of claim 9, wherein the first information includes information on at least one random access preamble and information on a RACH occasion.

* * * * *